United States Patent [19]

Sezan et al.

[11] Patent Number: 5,682,205
[45] Date of Patent: Oct. 28, 1997

[54] ADAPTIVE, GLOBAL-MOTION COMPENSATED DEINTERLACING OF SEQUENTIAL VIDEO FIELDS WITH POST PROCESSING

[75] Inventors: M. Ibrahim Sezan; Andrew J. Patti, both of Rochester, N.Y.

[73] Assignee: Eastman Kodak Company, Rochester, N.Y.

[21] Appl. No.: 709,525

[22] Filed: Sep. 6, 1996

Related U.S. Application Data

[63] Continuation of Ser. No. 293,348, Aug. 19, 1994, abandoned.

[51] Int. Cl.$^6$ .................... H04N 7/01; H04N 5/228
[52] U.S. Cl. .................... 348/452; 348/451; 348/208
[58] Field of Search .................... 348/208, 441, 348/447, 448, 451, 452, 458, 627, 628, 699, 700, 701; 358/525; H04N 7/01, 5/228

[56] References Cited

U.S. PATENT DOCUMENTS

| | | | |
|---|---|---|---|
| 4,472,732 | 9/1984 | Bennett et al. | 358/22 |
| 4,785,351 | 11/1988 | Ishikawa | 358/140 |
| 4,890,160 | 12/1989 | Thomas | 358/105 |
| 4,992,870 | 2/1991 | Samad | 358/140 |
| 4,998,168 | 3/1991 | Gillard | 358/140 |
| 5,005,077 | 4/1991 | Samad | 358/140 |
| 5,005,078 | 4/1991 | Gillard | 358/140 |
| 5,012,336 | 4/1991 | Gillard | 348/452 |
| 5,012,337 | 4/1991 | Gillard | 358/140 |
| 5,016,102 | 5/1991 | Avis | 358/140 |
| 5,019,903 | 5/1991 | Dougall | 358/140 |
| 5,021,870 | 6/1991 | Motoe | 358/11 |
| 5,021,881 | 6/1991 | Avis | 358/140 |
| 5,025,495 | 6/1991 | Avis | 358/140 |
| 5,027,203 | 6/1991 | Samad | 358/140 |
| 5,027,205 | 6/1991 | Avis | 358/140 |
| 5,036,393 | 7/1991 | Samad | 358/140 |
| 5,099,323 | 3/1992 | Morimura et al. | 348/208 |
| 5,134,480 | 7/1992 | Wang | 358/140 |
| 5,157,732 | 10/1992 | Ishii et al. | 348/208 |
| 5,162,907 | 11/1992 | Keating | 358/105 |
| 5,355,178 | 10/1994 | Parulski | 348/452 |

*Primary Examiner*—John K. Peng
*Assistant Examiner*—John W. Miller
*Attorney, Agent, or Firm*—Peyton C. Watkins

[57] ABSTRACT

A process and apparatus for generating a deinterlaced digital output image from a plurality of sequential interlaced image fields processes selected ones (a pair of immediately successive fields of the same polarity) of the plurality of sequential interlaced image fields, so as to produce a global motion vector estimate of global translational motion between the selected image fields. An accuracy map representative of accuracy of motion compensation is then generated in accordance with the global motion vector estimate. An adaptive deinterlacer selectively deinterlaces one of the image fields in accordance with the accuracy map. The selectively deinterlaced image field is subjected to postprocessing in order to remove judder artifacts that may be present in the deinterlaced image field as a result of a misclassification of the global motion vector estimate as being accurate in one or more image regions of the deinterlaced image field.

71 Claims, 11 Drawing Sheets

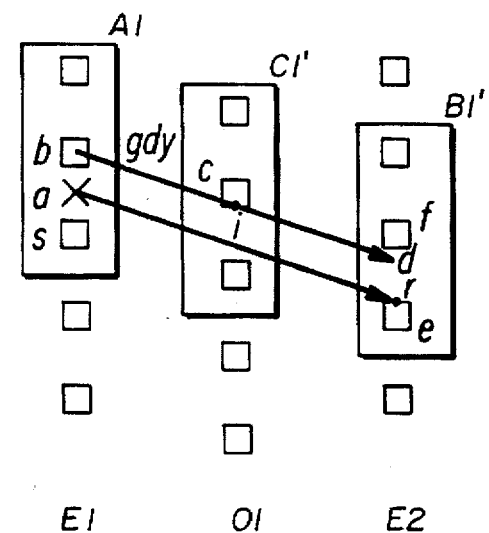
FIG. 14C
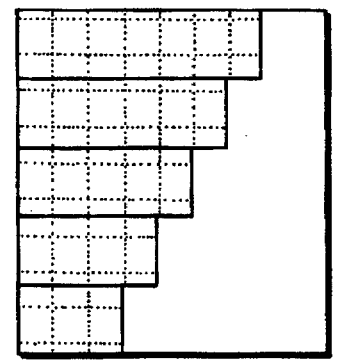
"NO JUDDER"
FIG. 15A
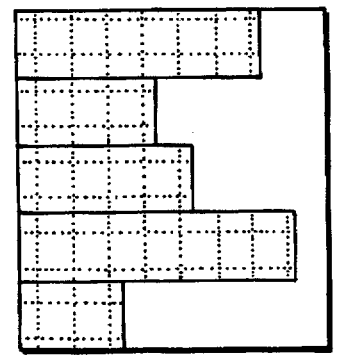
"JUDDER"
FIG. 15B
FIG. 16
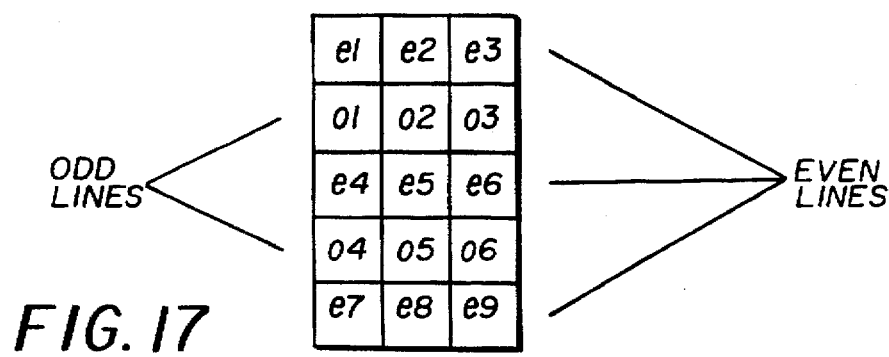
FIG. 17

ADAPTIVE, GLOBAL-MOTION COMPENSATED DEINTERLACING OF SEQUENTIAL VIDEO FIELDS WITH POST PROCESSING

This is a Continuation of application Ser. No. 08/293,348, filed 19 Aug. 1994 now abandoned.

FIELD OF THE INVENTION

The present invention relates in general to image signal processing and, in particular, to a mechanism for obtaining an image frame that has been progressively scanned, or deinterlaced, from multiple fields of an interlaced video signal, using adaptive interpolation that switches between global motion compensated interpolation and spatial interpolation, on the basis of the accuracy of global motion compensation using an estimated global inter-field displacement vector.

BACKGROUND OF THE INVENTION

In order to display interlaced video signals on a progressive or sequential line display with high visual quality, it is necessary to 'deinterlace' interlaced odd and even fields of video pixels into a sequentially continuous field of pixels without inter-line gaps. In addition, deinterlacing, prior to printing, may result in higher quality still pictures from video.

FIG. 1 diagrammatically illustrates an interlaced video frame of pixels formed of two time sequential fields—an even field and an odd field. Compared to a full frame of successive lines without missing lines of pixels, each (odd or even) field is subsampled by a factor of two in the vertical dimension. As a result, an even field contains data at only even-numbered line locations (e.g. lines 0, 2, 4, 6, and 8), and an odd field contains data at only odd-numbered line locations (e.g. lines 1, 3, 5, 7,). Thus, an even field has no pixel values for odd numbered lines of the full frame, and an odd field has no pixel values for even numbered line of the full frame.

In order to deinterlace an even (or an odd) field into a full frame without missing lines of pixels, it is necessary to estimate the missing odd (or even) lines. One well-known method for this purpose involves merging the even and odd fields together, namely simply filling in the missing lines of the odd (even) field with the lines of the immediately adjacent even (odd) field. Unfortunately, such an approach introduces "judder" artifacts at portions of the image containing moving objects (i.e. objects that move within the time interval of two successive fields). On the other hand, merging provides optimal spatial resolution at steady image regions (namely at those pixel locations where the image does not change between successive fields).

Another approach is to concentrate on a single field only (i.e., the odd field) and interpolate the missing lines using spatial interpolation. One example of a relatively simple spatial interpolation technique involves vertical bilinear interpolation, in which an average of the available pixel values in lines immediately above and below the pixel of interest in the missing line is assigned to the missing pixel. However, this method may cause artifacts if the missing pixel is over an edge whose orientation is not vertical.

To overcome these artifacts, an edge-adaptive spatial interpolation method, described in the Dougall, et, al., U.S. Pat. No. 5,019,903, entitled "Spatial Interpolation Between Lines of a Supersampled Digital Video Signal in accordance with a Gradient Vector Selected for Maximum Matching of Blocks of Samples which are Offset in Opposite Directions," has been proposed. The patented technique first attempts to determine the orientation of the image gradient at the missing pixel, and then interpolation is performed using image values that are located along this determined orientation, in order not to "cross an edge" and cause unwanted artifacts.

The Dougall et al. patent proposes that a potentially more effective method would be to use a hybrid scheme, where the deinterlacing process would switch, on a pixel-by-pixel basis, between merging and (edge-adaptive) spatial interpolation, depending on the dynamics of the image at the locations of the missing pixels, so that the reduced complexity advantages of using merging in steady regions of the image would be maintained.

In order to classify the dynamics of each pixel as either a "moving pixel" or "steady pixel," it would be necessary to employ a motion detection scheme as a precursor to choosing merging or interpolation. However, the Dougall et al patent offers no discussion as to how to implement such a mechanism.

In order to detect motion in an image, the contents of successive image fields of opposite polarity (even-odd or odd-even) can be compared with one another. However, the accuracy of motion detection can be increased significantly when two consecutive fields of the same polarity (i.e., an immediately preceding even (odd) field (i−1) and an immediately succeeding even (odd) field (i+1)), between which an odd (even) field (i) occurs, are utilized for motion detection.

The Bennett et al., U.S. Pat. No. 4,472,732 describes a method which employs the pixel-to-pixel difference of neighboring fields with the same polarity (e.g. even fields) that immediately follow and precede the field to be deinterlaced (e.g. an odd field), in order to perform motion detection. The method then switches between merging and vertical interpolation depending upon the presence and absence of motion that is determined by thresholding the difference values.

Unfortunately, the use of single-pixel differences may falsely detect 'no motion' if the scene is such that the gray levels of the pixels being compared in the two neighboring fields are similar, even though there is motion in the scene. Such a situation may occur, for instance, in the case of scenes that contain a moving structure with text on it.

An example of this circumstance is illustrated in FIG. 2, which diagrammatically depicts what is essentially a black letter 'E' rotated clockwise by 90° and situated against a white background. For this illustrated image, a 'no motion' decision is rendered at the (missing) pixel location (x,y) in the field at time t2, by differencing co-located values at fields at times t1 and t3, although there is motion at that pixel location. In this case, merging the fields at times t1 and t2 at pixel location (x,y) will result in artifacts due to this false classification.

The occurrence of such false classifications may be reduced by differencing and thresholding an N1×N2 block of pixels (e.g. N1=N2=3) rather than a single pixel. The benefits of using a 1×2 block (i.e. N1=1, N2=2), for instance, and thresholding the difference $(\frac{1}{2})(f(x,y,t1)-f(x,y,t3)+(f(x+1,y,t1)-f(x+1,y,t3))$ to detect whether or not the missing pixel $f(x,y,t2)$ belongs to a moving region may be seen in FIG. 3, where $f(.,.,.)$ denotes the spatiotemporal distribution of the fields.

If, as shown at time t4 in FIG. 4, a further fourth field is used for motion detection, a comparison of the fields at times t2 and t4 (in addition to the comparison of the fields at times t1 and t3) may increase the reliability of motion detection. In the example of FIG. 4, a "moving" decision can be rendered for the pixel of interest in the frame at time t2 as a result of comparing the corresponding pixels (at spatial location (x,y)) at frames at times t2 and t4.

The Ishikawa U.S. Pat. No. 4,785,351 describes a deinterlacing scheme, as applied to a time sequence of interlaced fields, such as an interlaced TV video signal, where motion detection is based not only upon the pixel-to-pixel difference of immediate neighbors (e.g. fields at t2 and t4, shown in FIG. 5), but also on the basis of a motion detection signal that has been obtained previously for deinterlacing t2, using t1 and t3, so as to effectively employ four consecutive fields.

In the scheme detailed in the '351 patent, in an effort to reduce noise, an average of existing pixel values of the fields surrounding the field of interest is placed in the location of the missing pixel, rather than directly using the value of a neighboring pixel (e.g. merging). However, since the existing lines in the field of interest that are directly reproduced in the deinterlaced version of the image are not processed for noise reduction, the averaging process for missing pixels may introduce some undesirable artifacts in the resulting image frame.

Although such artifacts may not be visible in TV viewing applications, where the resulting frames are displayed in motion, they may be objectionable when the resulting deinterlaced frames are reproduced as still images (for display or printing). For example, over a stationary region, the missing lines that are generated by temporal interpolation may appear less noisy than the adjacent unprocessed (existing) field lines, causing a visually disturbing effect, especially noticeable in printing applications.

Another four-field based motion detection approach is described in the Motor et al, U.S. Pat. No. 5,021,870, where the missing pixel of interest is set to a value that is equal to a linear combination of the result of temporal averaging of values belonging to the surrounding fields that have the same polarity, and the result of vertical spatial interpolation performed using the existing pixel values of the field of interest. The motion detection signal determines the weights assigned to these two quantities in forming the linear combination. This method uses a rolling memory system formed of three field stores and supplies the values of the deinterlaced frame pixel by pixel to a display system. As in the above-referenced '351 patent, pixel-by-pixel differences are employed to generate a motion detection signal.

These techniques that adapt themselves to the presence or existence of motion, using a motion detection signal, are not beneficial in the case of video images containing no steady regions. In such cases, each of these techniques will fall back to spatial interpolation by design; thus, further improvement in resolution will not be obtained. Such video images may be acquired, for example, by cameras that are hand-held and/or cameras that pan the scene of interest. Since handheld video cameras are becoming increasingly common in consumer applications, there is a growing interest in incorporating a deinterlacing mechanism (e.g., to be used in generating good-quality prints from video) that improves the resolution via motion compensated temporal interpolation, using new information contained in neighboring fields.

One motion-compensated deinterlacing technique, described in the Wang et al, U.S. Pat. No. 5,134,480, is a time-recursive method that performs motion estimation and compensation on a local basis (for each pixel) by way of block matching. Due to the time-recursive nature of this method, a history of the deinterlaced versions of the fields that precede the field of interest is maintained. In order to increase the accuracy of local motion estimation, a quad-tree hierarchy is used in adjusting the block size.

In this method, deinterlacing is performed by linearly blending the results of spatial vertical interpolation and motion compensated interpolation, where motion compensation is executed using either the future field immediately following or subsequent to the field of interest or using the recursively deinterlaced version of the previous or immediately prior field.

In general, not only is local motion estimation for every pixel location computationally expensive, it is complicated by the existence of covered/uncovered regions (i.e., occlusions) and sharply varying motion vectors at boundaries of objects that move independent of each other.

For a review of the problem of increasing the accuracy of motion vectors that are estimated for each pixel using block matching, attention may be directed to the following U.S. Pat. Nos: 5,027,203; 5,025,495; 5,021,881; 5,162,907; 5,016,102; 5,012,337; 5,005,078; 5,012,336; 4,992,870; 5,027,205; 5,005,077; 5,036,393; and 4,998,168. These patents describe the use of a series of motion vector measurements, motion vector selection, and motion vector reduction in an attempt to increase the accuracy of estimated local motion vectors. However, these methods are significantly computationally intensive.

SUMMARY OF INVENTION

The present invention is directed to a new and improved deinterlacing system that compensates for global inter-field motion and then adapts itself to the accuracy of the global motion compensation. Global inter-field motion may be due, for instance, to the motion of a hand-held camera. If the estimate of the global motion vector, and hence the global motion compensation is accurate, global-motion compensated interpolation is selected. Otherwise, spatial interpolation is employed. Such a fall-back situation occurs, for instance, at image regions that contain objects that move independently with motion different than global motion. In these image regions, the global motion vector is inaccurate since it does not represent individual motion.

The deinterlacing system according to the present invention also contains a postprocessing stage where the deinterlaced image is processed to remove judder artifacts that may be present in the image as a result of a misclassification of the global motion vector estimate as being accurate in certain image regions. Deinterlacing of a particular field is performed using that field itself and its two next immediately succeeding fields. For instance, to deinterlace a respective even field, that even field and its immediately following odd field, and the next even field immediately following that odd field are used.

As will be described in detail below, the inventive deinterlacing system employs four major functional components that operate on these three immediately successive fields, which are stored in three respective field stores, to generate a deinterlaced version of the first field in the sequence of three. These four functional components include: (1)—global motion vector (GMV) estimation, where an estimate of the global translational motion between the first and third fields is determined; (2)—detection of the accuracy of motion compensation using the GMV estimator at each pixel location, and forming a binary accuracy map; (3)—motion compensation accuracy adaptive deinterlacing, and (4)—postprocessing.

The use of global motion compensation employing a single global motion vector estimate is to be contrasted with local motion compensation using a multitude of locally estimated motion vectors as in described in the previously referenced Wang et al, U.S. Pat. No. 5,134,480. In addition, unlike the Wang et al approach, the present invention is adaptive to the accuracy of motion estimation, described by the binary accuracy map. The motion compensation accuracy adaptive deinterlacing operation switches between motion compensated interpolation and spatial interpolation, depending on the motion vector accuracy. The former is chosen for pixels that can be motion compensated accurately using the global motion vector.

Such an implementation imparts flexibility to the invention, since any spatial interpolation (e.g., directional rather than vertical) can be utilized, depending on the hardware, speed of operation, and image quality constraints. Further, the invention is non-recursive, in contrast to the time-recursive method described in the Wang et al patent. The deinterlacing mechanism of the present invention does not require a history of the previous deinterlacing results. Although such a requirement, induced by the recursive nature of the time-recursive method, may be acceptable in a progressive-display TV environment, where incoming interlaced video signals are continuously deinterlaced, it may be inappropriate in the case of a video printer, where image prints are produced by momentarily activating the printing process when a desirable scene is viewed, without necessarily having an access to a deinterlacing history.

The present invention estimates a single global motion vector, corresponding to a relative translational displacement between the camera and the scene. For example, if the original scene contains a moving object situated against a stationary background, and the camera undergoes a translational motion (e.g., due to hand motion), the background in the video sequence moves in an amount equal to the camera motion and its movement is described by the global motion vector. In such a cases, the invention results in a deinterlaced frame containing a sharp and crisp background that is devoid of aliasing artifacts.

Estimation and compensation of global motion is computationally less expensive than estimating and compensating for local motion on a pixel-by-pixel basis. In many cases, it may be possible to obtain a more accurate estimate of the global component of the motion than the spatially varying motion vector field. This is due to the fact that there will be, in general, a larger number of pixels that are affected by the global motion only, as compared to pixels that are affected by both global and independent object motion. An accurate estimate will be possible using this large set of points, without the need for extensive operations to estimate accurate local motion vectors.

In accordance with a preferred embodiment of the invention, a global motion vector estimation unit employs phase correlation to estimate the global displacement vector between immediately successive fields of the same image polarity (e.g. first and third (even) fields). In the phase correlation process, motion vectors are measured over four rectangular subregions of the image, termed regions of interest (ROI), located near the image borders and are likely to be affected by global motion only. Phase correlation is performed on each ROI on an individual basis, so that a respective phase correlation surface is obtained for each ROI. Phase correlation is computed between co-located ROI blocks of the two fields. Each phase correlation surface is then subjected to a thresholding operation, to produce a predetermined number of candidate motion vectors. This operation is repeated for four respective phase correlation surfaces associated with all four rectangular ROIs.

For each respective ROI, each member of its associated vector set is examined, and the vector that best describes the motion of the ROI is designated as the global displacement vector estimated within that ROI. For this purpose, pixel values within an ROI of one field are compared with the pixel values within a same-size block of pixels within the other field, where the block within the other field is displaced relative to the block in the one field by the candidate displacement vector that is being examined. The block in the other field is the corresponding block of the one field in the sense of motion.

The sum of absolute pixel-by-pixel differences (SAD) of the block in the one field and its corresponding displaced block in the other field is computed for each of the candidate vectors. That vector resulting in the smallest SAD is assigned to the block in the one field as its global displacement vector. The global displacement vectors for the other ROIs, are determined by carrying out the same sequence of steps for those ROIs.

The next step is to choose one of these vectors as a representative of the global displacement of the entire field. This is achieved by computing a SAD value over the entire field, using each one of the four vectors, and then choosing, as the global displacement vector describing the global motion of the entire field, that vector resulting in the least SAD. This global, pixel-accurate vector is then refined to subpixel accuracy.

The refined global motion vector estimation is coupled to accuracy detection unit, which receives each of the three fields as inputs and determines the accuracy of motion compensation using the estimator at each pixel location. The result of this determination is output as a binary accuracy map. The accuracy of global motion compensation is determined for every missing pixel in the one field (the field to be deinterlaced). The purpose of this accuracy detection operation is to determine whether or not the global displacement vector is sufficiently accurate to describe the motion of the missing pixel, and therefore useful in performing motion compensated deinterlacing (i.e., interpolation) for the missing pixel value.

The global displacement vector is expected to be accurate for missing pixels that lie in regions of the image that have undergone global motion. On the other hand, for pixels located on independently moving objects, the global displacement vector is expected to be inaccurate. Depending on the value of the vertical component of the global displacement vector, cases for describing the accuracy detection and subsequent adaptive deinterlacing will differ.

The deinterlacing operation adaptively switches between motion compensated interpolation and spatial interpolation in dependence upon the accuracy map. Interpolation may include spatial interpolation of the missing pixel on the basis of neighboring pixels, such as either vertical interpolation of pixels above and below the missing pixel, or directional interpolation along edge directions passing through the missing pixel.

Finally, postprocessing is performed to remove judder artifacts by determining respective first and second correlations between even lines, and even and odd lines that are adjacent to each other, comparing the ratio of the two correlations to a prescribed threshold, and selectively replacing pixel values by interpolated neighboring pixel values in dependence upon the result of the comparison. Selective replacement comprises replacing pixel values by average values of existing pixel values that are immediately above and below the replaced pixels.

The removed judder artifacts are those most objectionable and are due to possible misclassification of motion compensation as accurate at certain missing pixel locations. The postprocessing first determines the correlation between the even lines, and even and odd lines that are adjacent to each other. The ratio of the two correlations is then thresholded to determine judder. If there is judder, the pixel values over the odd lines, determined via deinterlacing, are replaced by average values of existing pixel values (over even lines) that are immediately above and below these pixels. Otherwise, the values remain intact and the next block is considered.

Figure 12A:
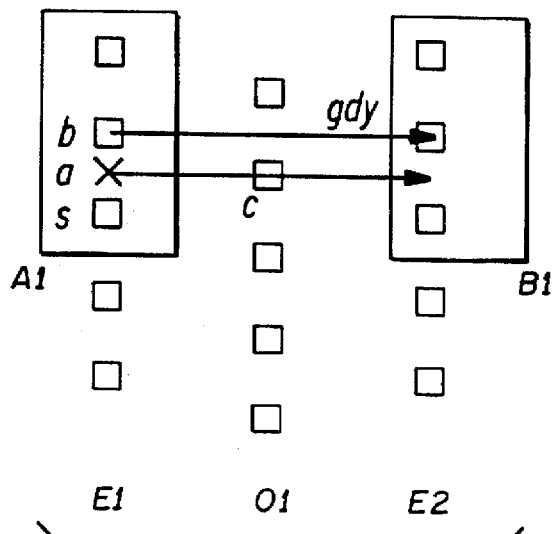
FIG. 12(a) diagrammatically illustrates a first case (Case 1) for pixel-wise detecting the accuracy of global motion compensation and adaptive interlacing.
Figure 12C:
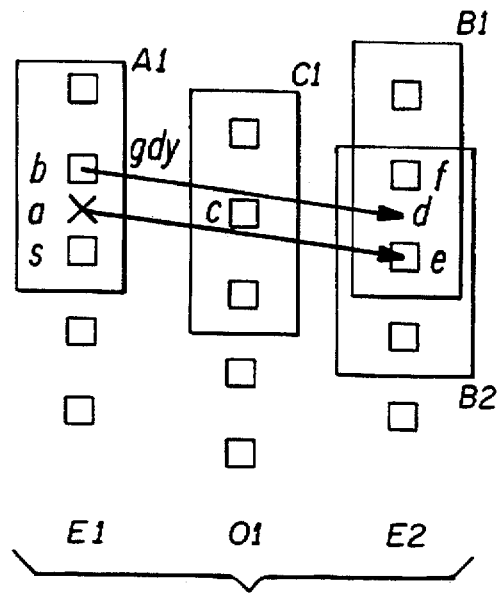
Figure 12B:
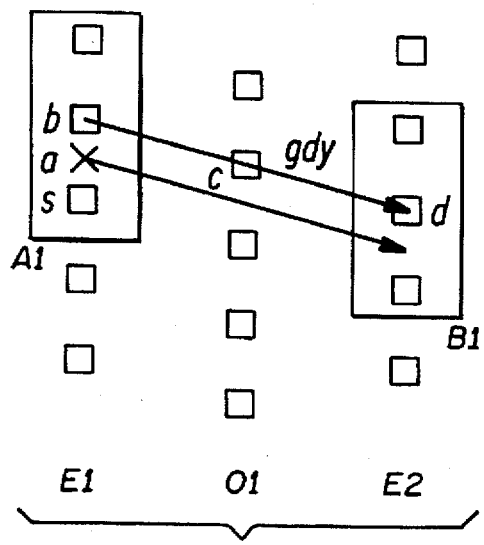
Figure 12D:
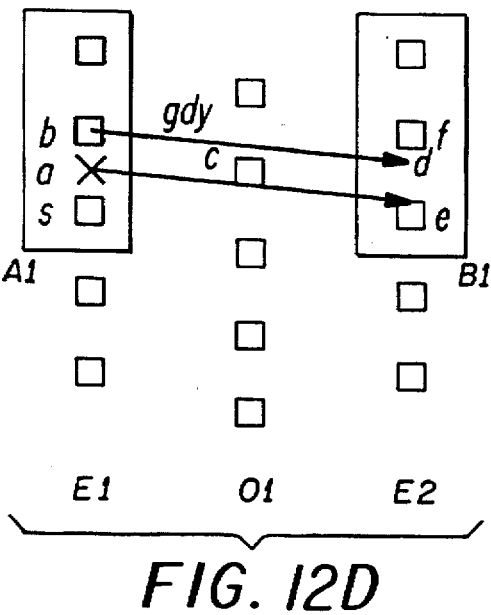
Figure 12E:
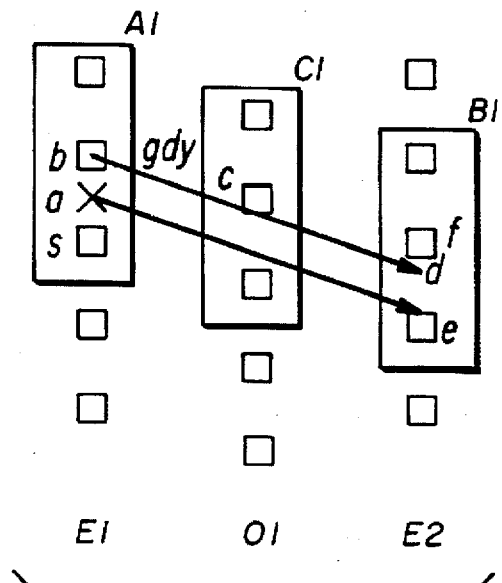
Figure 13:
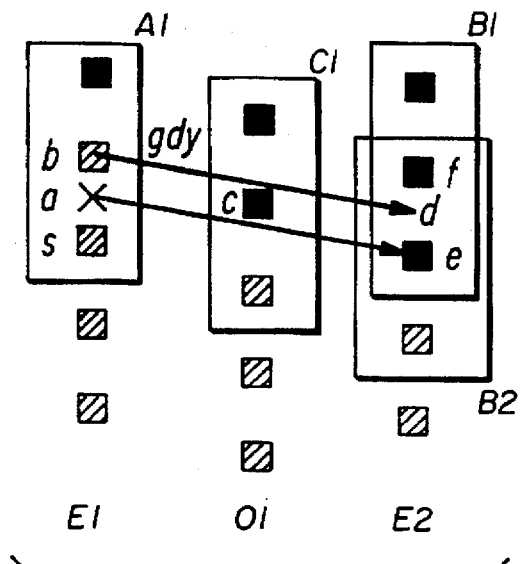
Figure 14A:
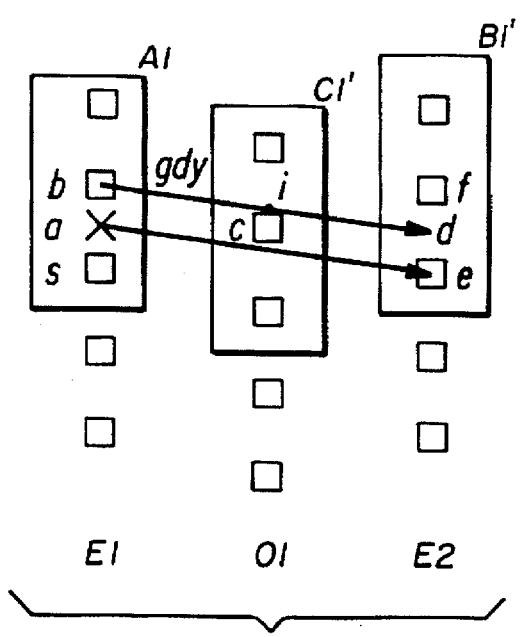
Figure 14B:
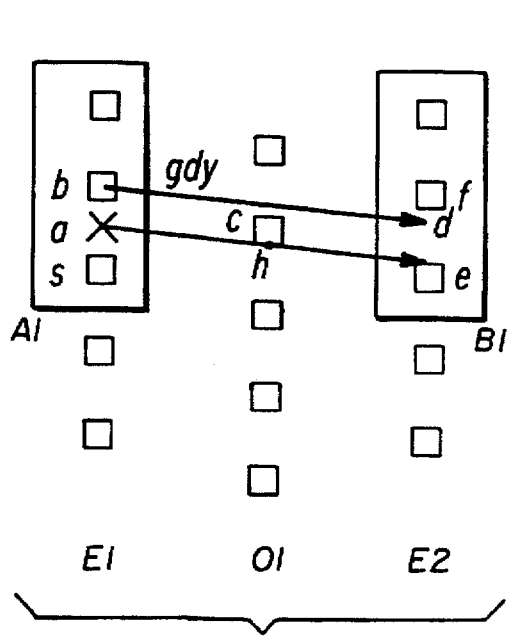

FIG. (12)b) diagrammatically illustrates a second case (Case 2) for pixel-wise detecting the accuracy of global motion compensation and adaptive interlacing;

FIG. 12(c) diagrammatically illustrates a third case (Case 3) for pixel-wise detecting the accuracy of global motion compensation and adaptive interlacing;

FIG. 12(d) diagrammatically illustrates a fourth case (Case 4) for pixel-wise detecting the accuracy of global motion compensation and adaptive interlacing;

FIG. 12(e) diagrammatically illustrates a fifth case (Case 5) for pixel-wise detecting the accuracy of global motion compensation and adaptive interlacing;

FIG. 13 diagrammatically illustrates the motivation behind the accuracy detection employed in Cases 3 and 5 of FIGS. 12 (c) and 12(e);

FIG. 14(a) diagrammatically illustrates an alternate implementation of Case 3 of FIG. 12(c), using bilinear spatial interpolation;

FIG. 14(b) diagrammatically illustrates an alternate implementation of Case 4 of FIG. 12(d), using bilinear spatial interpolation;

FIG. 14(c) diagrammatically illustrates an alternate implementation of Case 5 of FIG. 12(e), using bilinear spatial interpolation;

FIGS. 15(a) and 15(b) diagrammatically illustrates image regions containing a diagonal edge without and with judder, respectively;

FIG. 16 diagrammatically illustrates two postprocessing blocks with width (NW) and height (NH) parameters equal to four and two, respectively; and FIG. 17 diagrammatically illustrates an example of a postprocessing block used in postprocessing.

DETAILED DESCRIPTION

Before describing in detail the new and improved deinterlacing mechanism in accordance with the present invention, it should be observed that the present invention resides primarily in what is effectively a prescribed digital image processing technique that may be implemented by means of conventional digital signal processing circuitry, in particular, delay (shift register) components and arithmetic logic circuits, or may be embedded within image processing application software executable by the control processor of a digital image processing workstation, through which successive interlaced image fields of a scene are processed. The sources of such interlaced image fields may be conventional imaging hardware, such as interlaced lines of television signals derived from an NTSC system, as a non-limiting example, and are not considered part of the invention.

Consequently, the manner in which such interlaced image field sources are interfaced with either hardwired digital circuit components or a digital image processing workstation have been illustrated in the drawings in readily understandable block diagram format, which show only those specific details that are pertinent to the present invention, so as not to obscure the disclosure with details which will be readily apparent to those skilled in the art having the benefit of the description herein. Thus, the block diagram illustrations are primarily intended to illustrate the major components of the system in a convenient functional grouping, whereby the present invention may be more readily understood.

Figure 1:
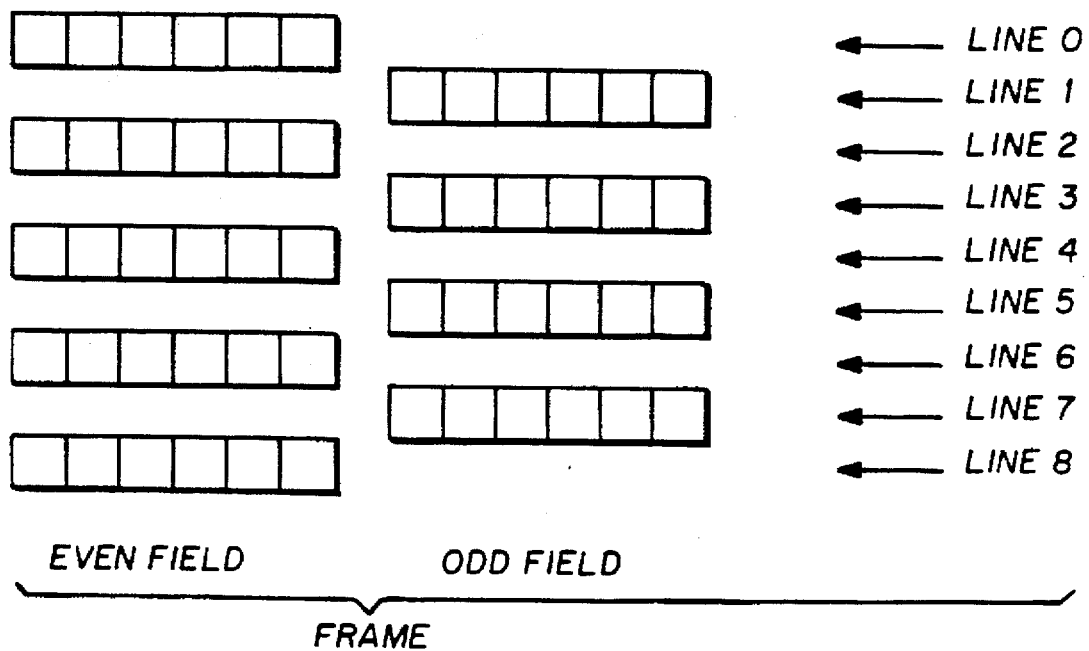
FIG. 1 diagrammatically illustrates odd and even fields of an interlaced video frame.
Figure 3:
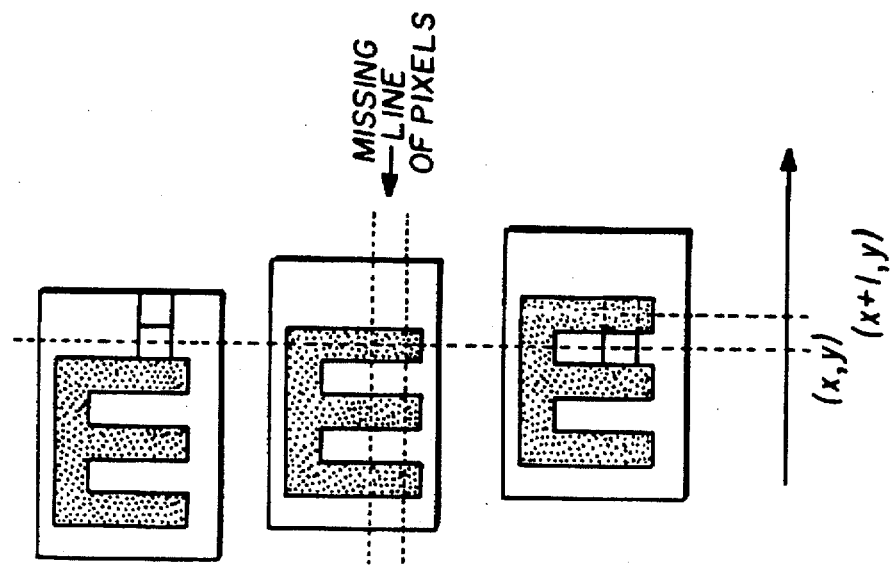
FIG. 3 diagrammatically illustrates increased reliability in motion detection of the image fields of FIG. 2 by comparing a 1×2 block of pixels.
Figure 2:
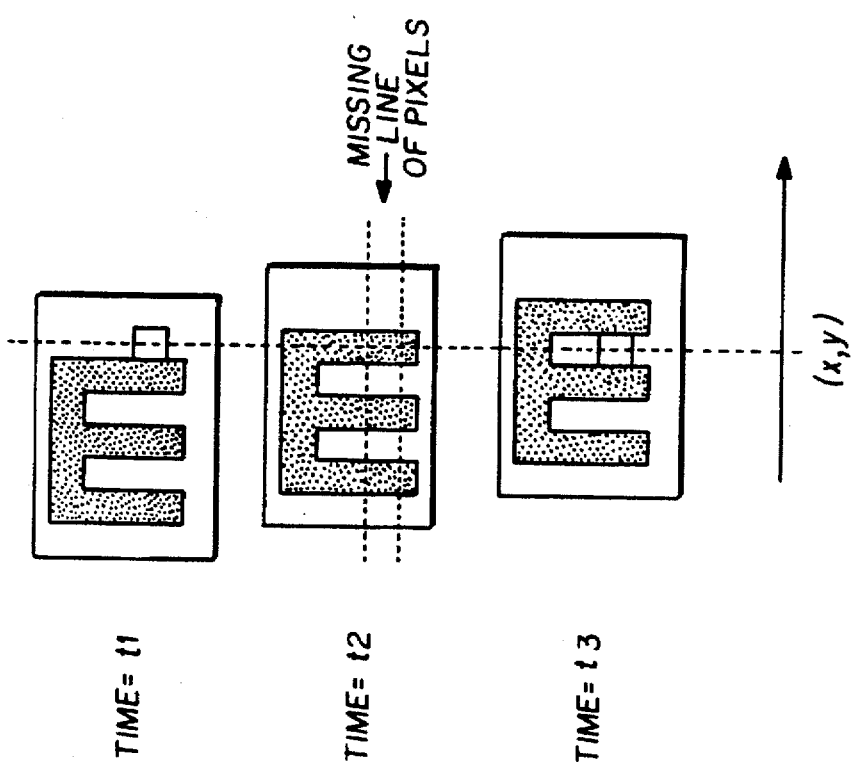
FIG. 2 diagrammatically shows motion detection for a missing pixel located at spatial location (x,y) within a frame at time t2 using existing co-located pixels within neighboring image fields.
Figure 4:
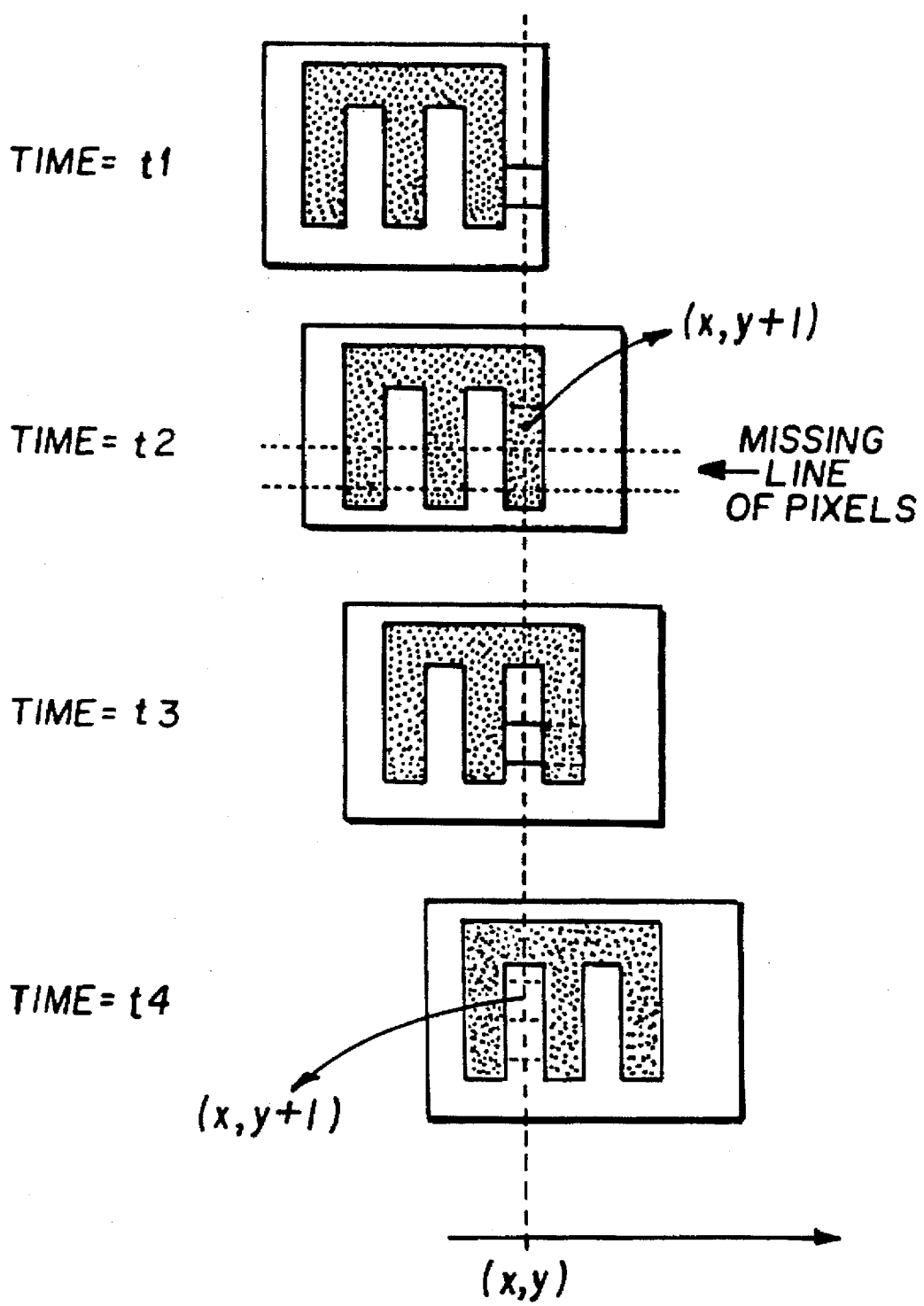
FIG. 4 diagrammatically illustrates increased reliability in motion detection of the image fields of FIG. 2 by using a fourth consecutive field.
Figure 5:
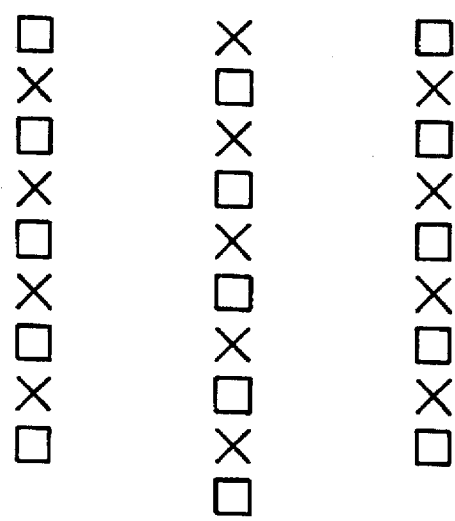
FIG. 5 shows vertical portions of three (temporally) successive fields (E1, 01 and E2), to be used in the deinterlacing system according to the present invention for deinterlacing the field E1.

As pointed out briefly above, the deinterlacing system according to the present invention deinterlaces a particular field by using that field itself and its two next immediately succeeding fields. As an illustration, FIG. 5 shows vertical portions of three temporally successive fields E1-01-E2, to be used in the deinterlacing system according to the present invention for deinterlacing the first field E1 in the sequence of three. In each of the fields of FIG. 5, missing pixels are denoted by 'X'.

Figure 6:
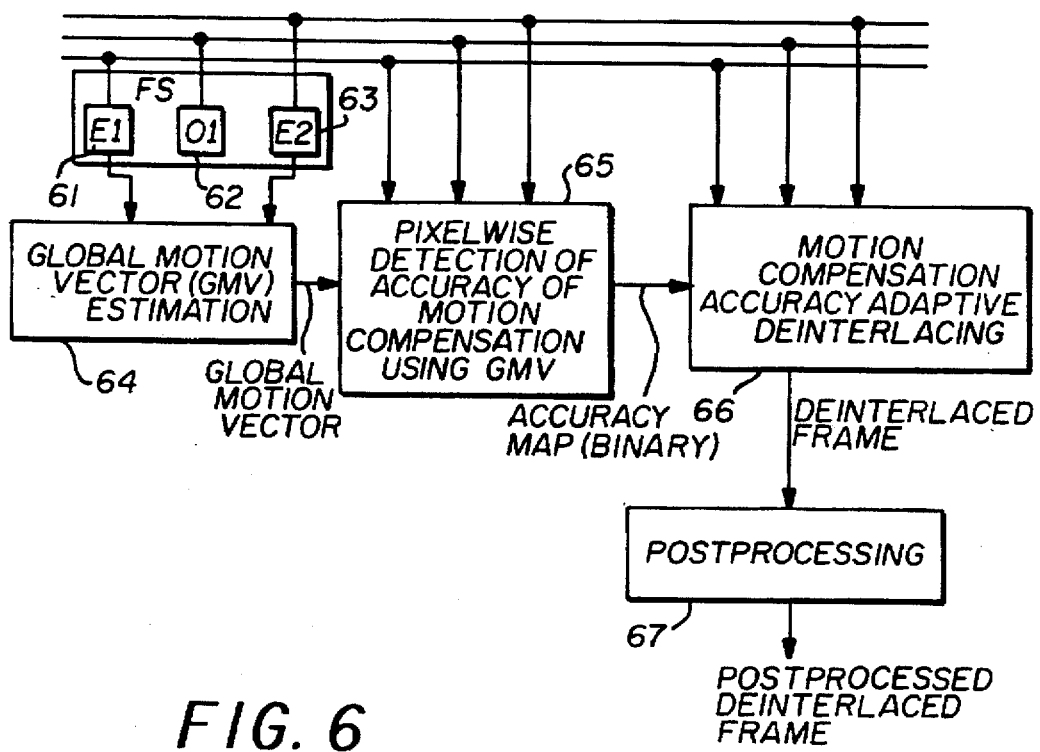
FIG. 6 is a functional block diagram of a deinterlacing system in accordance with the present invention.

FIG. 6 is a functional block diagram of a deinterlacing system in accordance with the present invention, which contains four major functional components that operate on three immediately successive fields E1-O1-E2, the pixel contents of which are stored in three respective field stores 61, 62 and 63. As will be described, using the deinterlacing process according to the invention, these three fields may be used to generate a deinterlaced version of the first field (E1) in the sequence of three. The deinterlace system of FIG. 6 includes a global motion vector (GMV) estimation unit 64, which is operative to determine an estimate of the global translational motion between the first (E1) and third (E2) fields. The output of global motion vector estimation unit 64 is coupled to unit 65 which receives each of the three fields as inputs and determines the accuracy of motion compensation using the GMV estimator at each pixel location. The result of this determination is output as a binary accuracy map to a downstream motion compensation accuracy adaptive deinterlacing unit 66, which is also coupled to receive each of the three fields as inputs. The resulting deinterlaced frame produced by deinterlacing unit 66 is output to a further downstream postprocessing unit 67, which postprocesses the deinterlaced frame, as will be described. Each of the image processing units of FIG. 6 will now be described in detail.

Global Motion Vector (GMV) Estimation Unit 64.

In accordance with a preferred embodiment of the invention, unit 64 contains a phase correlation operator to estimate the global displacement vector between the first and third (even) fields E1 and E2. Since phase correlation, per se, is well known, a rigid explanation of the same will not be provided here. For informational reference purposes, however, attention may be directed to U.S. Pat. No. 4,890, 160, BBC Research Department Report 1987/11, entitled "Television Motion Measurement for DATV and Other Applications," by G. A. Thomas), and an article by J. J. Pearson et al., entitled: "Video Rate Image Correlation Processor", SPIE vol. 119, Application of Digital Image Processing, (1977), pp. 197–205.

Figure 7:
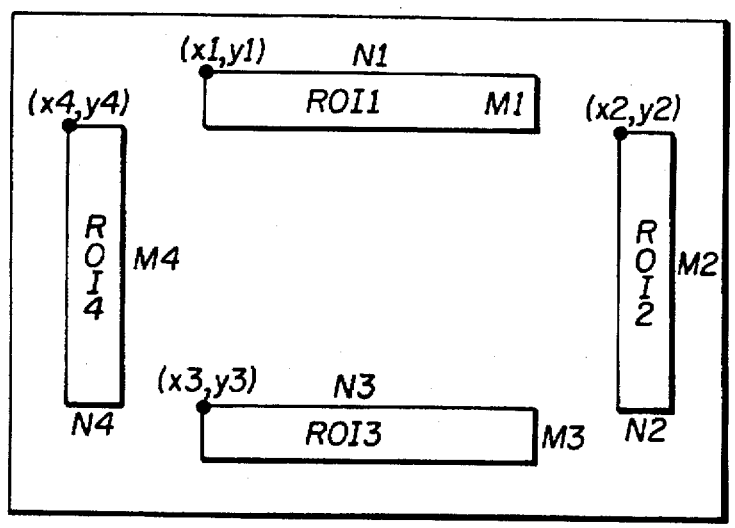
FIG. 7 depicts four image regions of interest (ROI) over which motion vectors are measured, using phase correlation.

As diagrammatically illustrated in FIG. 7, in the phase correlation process executed by global motion vector (GMV) estimation unit 64, motion vectors are measured over four rectangular subregions of the image, termed regions of interest (ROI), that are located near the image borders and are likely to be affected by global motion only. These regions of interest (ROI1–ROI4) are shown in FIG. 7 as being of size N1×M1, N2×M2, N3×M3, and N4×M4, and their locations are identified by their upper left image coordinates, (x1,y1), (x2,y2), (x3,y3), and (x4,y4).

As a non-limiting example, letting the size of the illustrated field be 360 pixels per line by 240 lines per field, the following parameters may be employed: N1=100, M1=50, (x1,y1)=(130,20); N2=100, M2=100, (x2,y2)=(240,70); N3=100, M3=50, (x3,y3)=(130,170); and N4=100, M4=100, (x4,y4)=(20,70).

As GMV estimation unit 64 performs phase correlation to each ROI on an individual basis, a respective phase correlation surface is obtained for each ROI, where phase correlation is computed between the co-located ROI blocks of even field images E1 and E2. Then, each phase correlation surface is subjected to a thresholding operation, thereby producing a predetermined number of candidate motion vectors. This operation is repeated for the four respective phase correlation surfaces associated with all four ROIs.

Corresponding candidate motion vector sets may be denoted as: S1, S2, S3, and S4, each set containing some number Nc (e.g. Nc=3) of candidate vectors. At this point, the candidate vectors have integer-valued components; hence, they are pixel-accurate. It should be noted that the ROI blocks may be pre-filtered to reduce the effects of noise, and windowed to reduce the effects of FFT boundary mismatch, as described in the above-referenced Thomas article.

Figure 8:
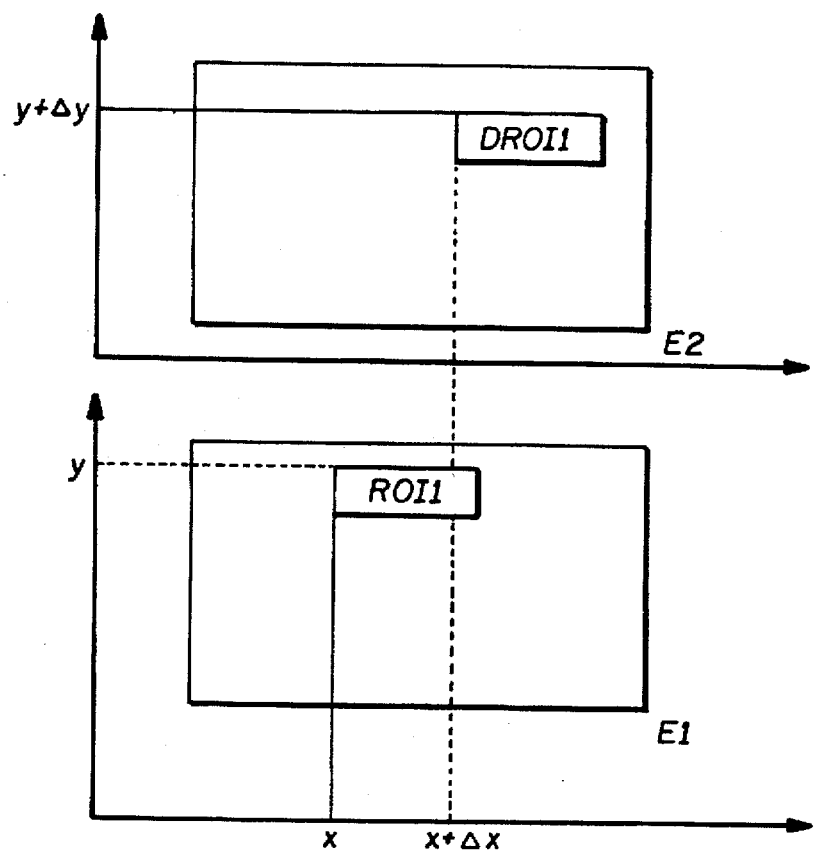
FIG. 8 diagrammatically shows the manner in which the validity of a candidate displacement vector (Δx,Δy) for a region of interest ROI1 is tested.

Next, for each ith ROI, each member of its associated vector set Si(where i=1,2,3,4) is examined, and the vector that best describes the motion of the ROI is designated as the global displacement vector estimated within that ROI. The manner in which a candidate vector for ROI1 (i.e., i=1), for instance, is examined, is depicted in FIG. 8, where the candidate displacement vector is denoted by $(\Delta x, \Delta y)$. In FIG. 8, the pixel values within ROI1 of even field E1 is compared with the pixel values within a same-size block of pixels within even field E2, where the block within even field E2, denoted by DROI1, is displaced (D) relative to ROI1 with the candidate displacement vector that is being examined or under test. The block in even field E2 is the corresponding block of ROI1 in even field E1 in the sense of motion. The sum of absolute pixel-by-pixel difference of the ROI1 and its corresponding block DROI1 is computed for each of the three candidate vectors.

For example, if the ROI1 block in even field E1 contains pixels having values p1,p2,p3, . . . ,pK, where K is the total number of pixels, and the corresponding block DROI1 contains pixels having values r1,r2,r3, . . . ,rK, then the (normalized) sum of absolute pixel-by-pixel difference is $(1/K) \Sigma^K_{j=1} |p_j - r_j|$, and may be denoted as $\Sigma|ROI1 - DROI1|$. The normalized summed absolute difference (SAD) is computed for each candidate vector. That vector resulting in the smallest SAD is assigned to ROI1 as its global displacement vector, and is denoted as (d1x,d1y). The global displacement vectors for the other ROIs, denoted by (d2x,d2y), (d3x,d3y), (d4x,d4y), are determined by carrying out the same sequence of steps for those ROIs. If the displacement is such that the displaced ROI, namely DROIi (i=1,2,3,4), in even field E2 is outside the boundaries of even field E2, then the SAD is computed using the pixels that belong to the largest common area of overlap between ROI and DROIi.

The next step is to choose one of these four vectors as a representative of the global displacement of the entire field. This is achieved by computing a SAD value over the entire field, using each one of the four vectors, and then choosing, as the global displacement vector describing the global motion of the entire field, that vector resulting in the least SAD.

Figure 9:
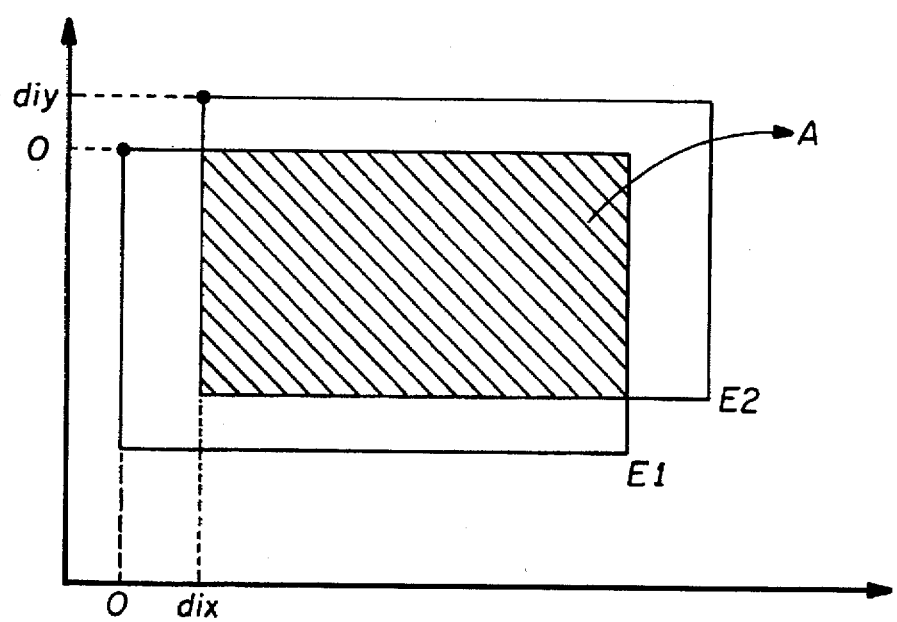
FIG. 9 diagrammatically illustrates the manner in which a displacement vector (dix,diy), belonging to an ith region of interest is processed to determine if it can describe global displacement of the entire image field.

More particularly, with reference to FIG. 9, the even field E2 is shown being displaced by (dix,diy) in order to test the vector (dix,diy) associated with ROIi (i=1,2,3,4). The value of SAD is computed on the basis of those pixels that are contained in the largest common area of pixels between even field E1 and the displaced version of even field E2. This largest common area is denoted by A in FIG. 9. The displacement vector that yields the smallest SAD over the common area A is chosen as the global displacement vector for the entire field and is denoted by (dx,dy). The components of this vector are integer-valued and hence the vector is pixel-accurate.

This global, pixel-accurate vector, (dx,dy), is next refined to subpixel accuracy. For purposes of providing a non-limiting example, the resolution refinement will be carried out to a one-quarter pixel accuracy. It should be observed, however, that such a sub-pixel resolution is provided for purposes of illustration only; other sub-pixel resolutions may be obtained as desired using the refinement process of the present invention, without a loss of generality of the sub-pixel improvement routine herein described.

Figure 10A:
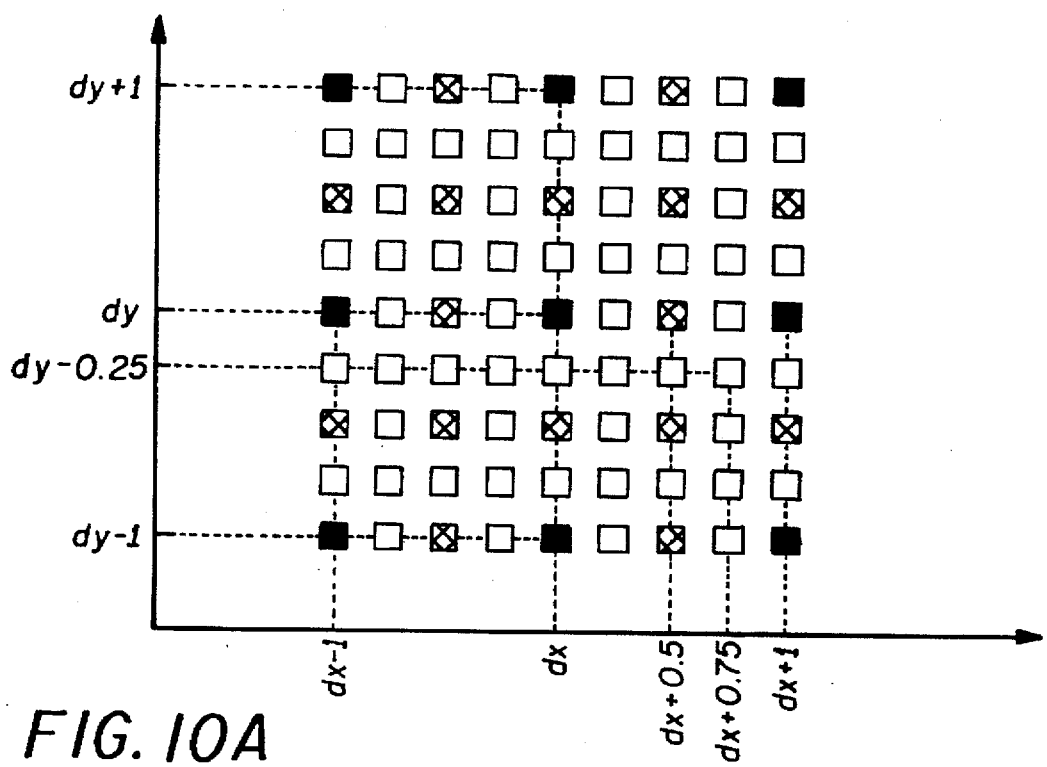
FIG. 10(a) depicts a pixel array illustrating a first method for refining the pixel-accurate global displacement vector (dx,dy), to a one-quarter pixel accuracy.

FIG. 10(a) diagrammatically illustrates a first of a two sub-pixel refinement procedures that may be performed.

Pursuant to this first routine, the even field E2 is shifted so that spatial coordinates of its upper left corner coincide with the grid points shown in FIG. 10(a), where the grid points correspond to pixel (black), one-half pixel (gray) and one-quarter pixel (white) locations around the point of relative pixel-accurate displacement, (dx,dy). The 9×9 array of (81) points shown in FIG. 10(a) provides a search grid for refining the vector (dx,dy) to the desired one-quarter pixel accuracy of the present example. The corresponding SAD is computed for each one of the 81−1=80 locations around the location (dx,dy), since the corresponding SAD over A in FIG. 9 for (dx,dy) has already been computed in the previous step, as described above.

Figure 10B:
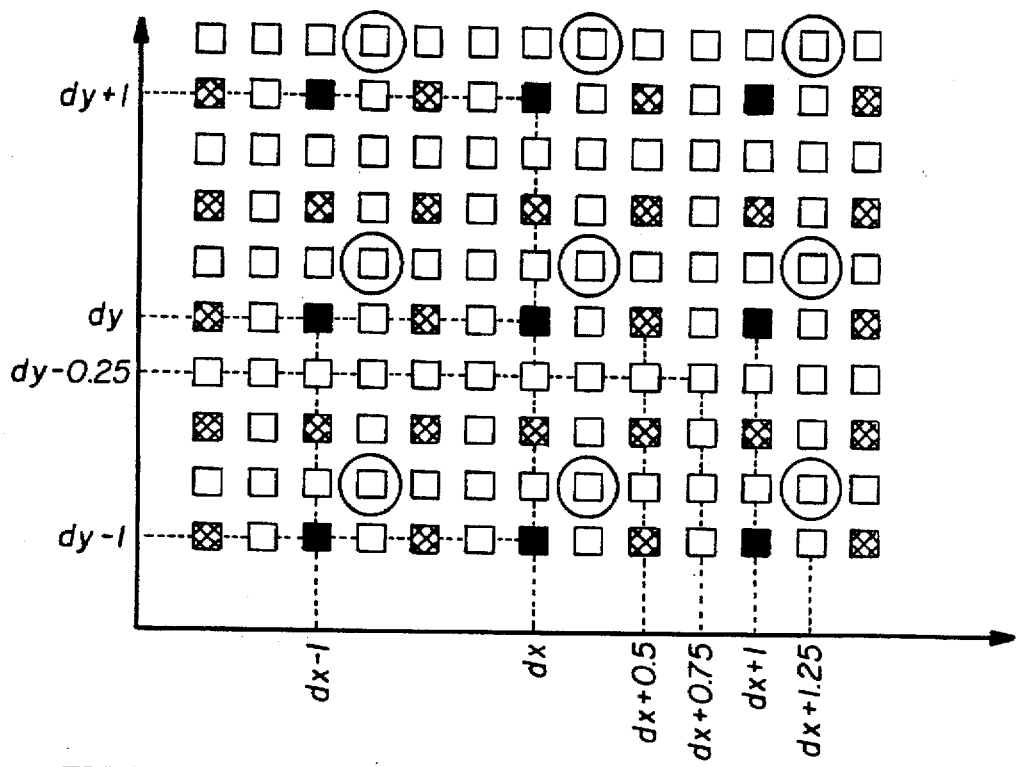
FIG. 10(b) depicts a pixel array containing a plurality of points among samples of the even field of FIG. 10(a), which are employed in testing the vector (dx+0.25, dy+0.25)

For instance, the SAD computed to test the displacement (dx+0.25, dy+0.25) uses the points shown as inscribed in circles in FIG. 10(b), and the computation continues so as to encompass the largest overlapping area between even fields E1 and E2, for this displacement. As a consequence, the SAD computation requires interpolation of the necessary interpixel values within the even field E2, and the set of interpolated pixels that are needed depends on the displacement being tested. (It should be noted that the even field E1 does not have to be interpolated.) In accordance with a preferred embodiment of the present invention, use bilinear interpolation is employed.

A second refinement procedure that may be used involves a smaller number of SAD computations, and performs the refinement in two steps. The first step performs refinement into half-pixel accuracy, and the second step then refines the half-pixel accuracy result into the target one-quarter pixel accuracy. This method is diagrammatically illustrated in FIG. 10(c), where the point marked by "1" denotes the pixel location of the upper left corner of the displaced (with the pixel-accurate vector (dx,dy)) field E2.

Again, the corresponding SAD over the overlap area A in FIG. 9, for (dx,dy), has already been computed in the previous step, as described above with reference to FIG. 9. To perform refinement to half-pixel accuracy, the even field E2 is shifted so that spatial coordinates of its upper left corner coincide with the half-way interpixel locations, shown as gray squares in FIG. 10(c); a respective SAD is computed for each of the eight possible locations, and that location resulting in the least SAD value then defines the half-pixel accurate motion vector.

Figure 10C:
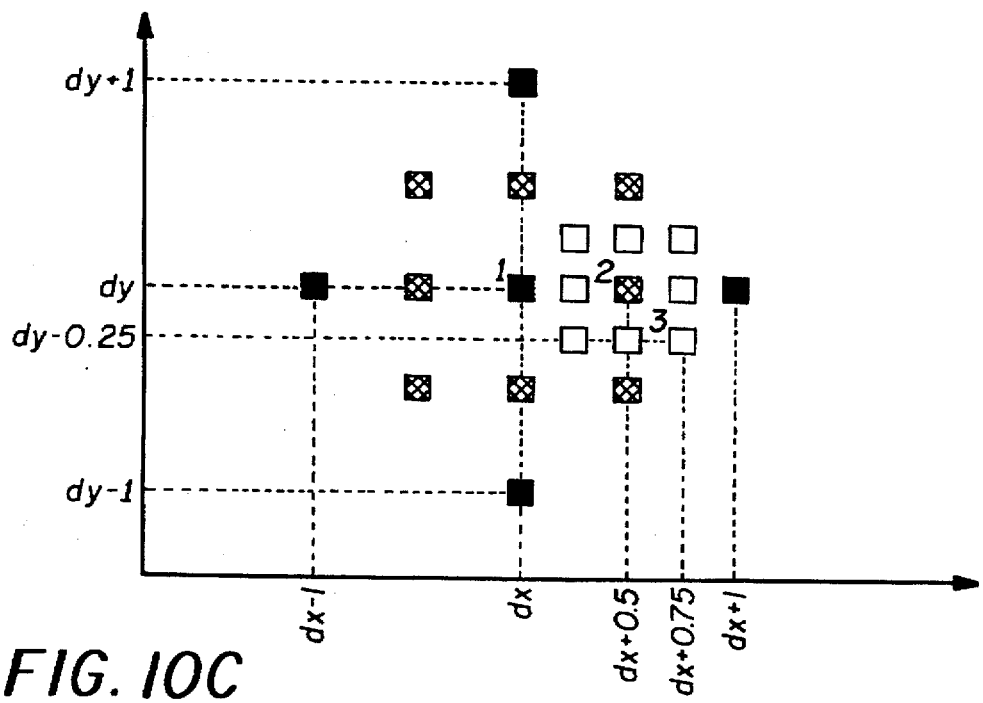
FIG. 10(c) depicts a pixel coordinate distribution associated with a second method for refining the pixel-accurate global displacement vector (dx,dy), to one-quarter pixel accuracy.

In the example shown in FIG. 10(c), the SAD is minimum at the location denoted as "2", i.e., the vector is refined to (dx+0.5, dy). A further refinement to quarter pixel accuracy is then performed by computing and minimizing the SAD as a result of displacing E2 to successive quarter-pixel locations, shown as white squares in FIG. 10(c). Letting the minimum SAD value be produced for the location denoted by "3", the final, one-quarter pixel accurate global displacement vector becomes (dx+0.75, dy−0.25). As in the case of the first routine, described above, SAD computation is limited to the largest area of overlap between even fields E1 and E2, and bilinear interpolation of E2 is performed, as necessary.

The one-quarter pixel accurate global displacement vector, obtained using either of the routines described above is denoted as (gdx,gdy). To increase computational speed, refinement of displacement vector to one-quarter pixel accuracy can be performed on the basis of the ROI that provides the best pixel-accurate displacement vector, rather than using the entire field.

Figure 11:
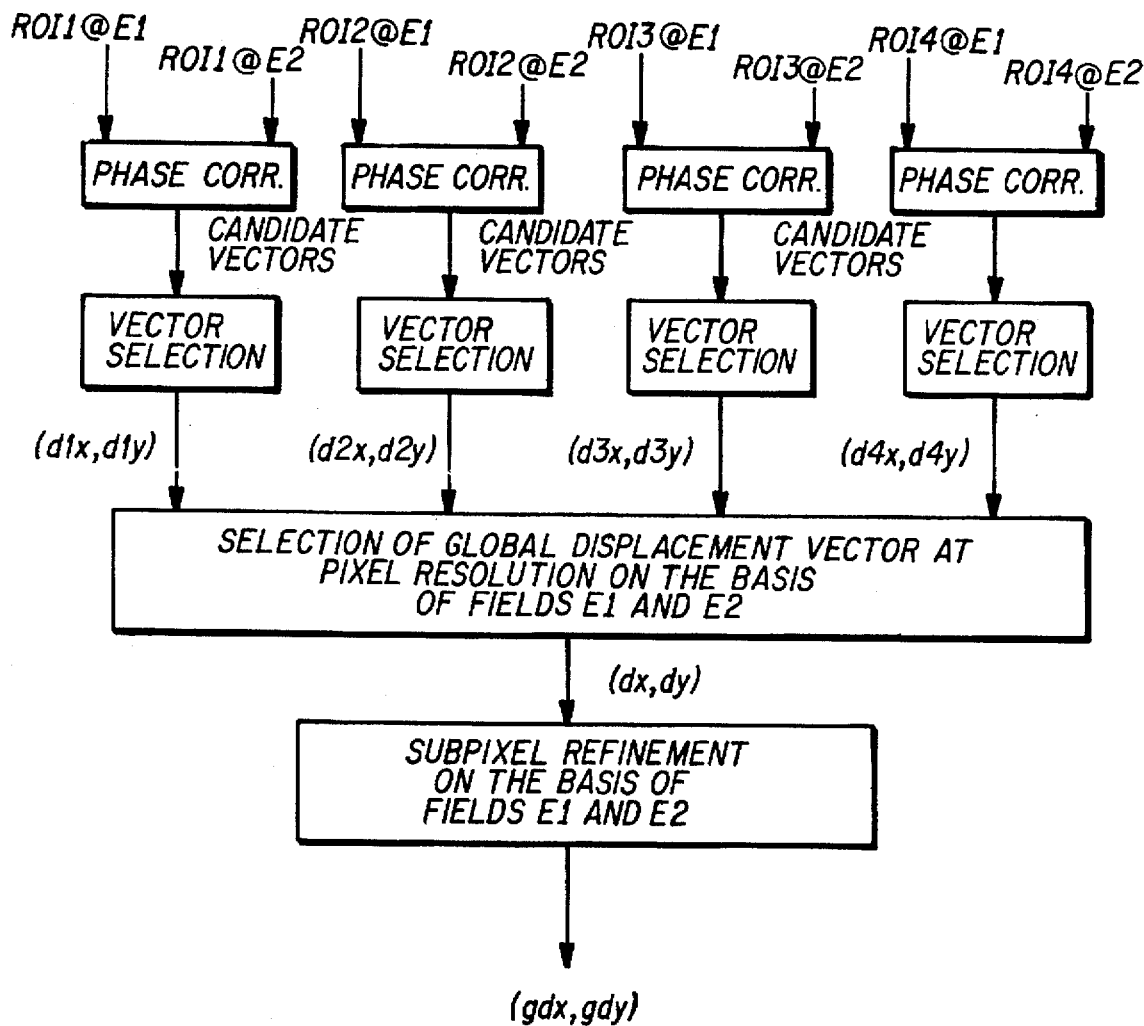
FIG. 11 is a functional block diagram of a deinterlacing system in accordance with the present invention, showing steps for estimating a global displacement vector with one-quarter pixel accuracy.

The overall process flow for estimating a subpixel-accurate displacement vector (e.g. one-quarter pixel accuracy, as in the present example) for the respective ROIs for the two even fields E1 and E2 is diagrammatically illustrated in FIG. 11. (It should be noted that displacement vector estimation is applied to the luminance component of the video data only, without loss of generality.)

As pointed out above, with reference to the overall deinterlace system shown in FIG. 6, the output of global motion vector (GMV) estimation unit 64 is coupled to accuracy detection unit 65, which receives each of the three fields as inputs and determines the accuracy of motion compensation using the GMV estimator at each pixel location. The result of this determination is output as a binary accuracy map. The operation of accuracy detection unit 65 and adaptive deinterlacing unit 66 will now be described.

Pixelwise Detection of The Accuracy of Global Motion Compensation Unit 65 and Adaptive Deinterlacing Unit 66

The accuracy of global motion compensation is determined for every missing pixel in even field E1 (the field to be deinterlaced). The purpose of this accuracy detection operation is to determine whether or not the global displacement vector provided by GMV unit 64 is sufficiently accurate to describe the motion of the missing pixel, and hence useful in performing motion compensated deinterlacing (i.e., interpolation) for the missing pixel value. The global displacement vector is expected to be accurate for missing pixels that lie in regions of the image that have undergone global motion. On the other hand, for pixels located on independently moving objects, the global displacement vector is expected to be inaccurate. Depending on the value of the vertical component of the global displacement vector (gdx,gdy), there are five different cases for describing the accuracy detection and subsequent adaptive deinterlacing, as follows:

Case 1: gdy is an even integer, i.e., gdy=±2 k, where k=0,1,2, . . .

Case 2: gdy is an odd integer, i.e., gdy=±(2 k+1), where k=0,1,2, . . .

Case 3: gdy has a 0.5 fractional part, i.e., gdy=±(2 k+1)0.5, where k=0,1,2, . . .

Case 4: gdy is equal to ±[2 k±0.25], where k=0,1,2, . . .

Case 5: gdy is equal to ±[2 k+1)±0.25], where k=0,1,2, .

Vertical components of global displacement vectors, denoted by gdy, for these five cases are diagrammatically illustrated in FIGS. 12(a)–12(e), which show only the vertical field samples, and where k=0 without loss of generality. In the following description of motion-compensated interpolation, it will be assumed that the motion trajectory is linear, i.e., the velocity is constant and there is no accelerated motion between even fields E1 and E2. It will also be assumed that the missing pixel is displaced in the same way as the available pixel located immediately above it. (This can be viewed as a spatial smoothness constraint on the displacement vectors.)

In FIGS. 12(a)–12(b), the global displacement vector is depicted as a bold solid line vector. The wavy or dotted line vector which is parallel to the bold global displacement vector represents the assumed motion trajectory of the missing pixel. For purposes of providing a non-limiting example the missing pixel is located at spatial position a. The process described herein may be readily applied and is equally valid for all other missing pixel locations.

For Case 1, illustrated in FIG. 12(a), the accuracy of motion compensation for the missing pixel located at position a is tested by thresholding the SAD of the two N×M blocks of pixels (e.g., N=M=3), one centered at location b within even field E1, shown as A1 in FIG. 12(a), and the other centered at location d within even field E2, shown as B1 in FIG. 12(a). Letting SAD be denoted as Σ|A1−B1|, then the global displacement vector (gdx,gdy) is accurate for performing motion compensated interpolation for the missing pixel located at position a, if Σ|A1−B1|<T1. A typical value for T1 is 10. If this is the case, a "1" is denoted at the corresponding location of the binary "accuracy-detection array", termed BDA. (It should be noted that the size of BDA is equal to the size of a field and for each missing pixel location there is a corresponding location in BDA.)

Motion-compensated interpolation is achieved by copying the value of the pixel located at position c in odd field O1 to the missing pixel location a. In other words, the missing pixel value is replaced by the pixel value at location c, i.e., value(a)=value(c), where value (y) denotes the value of the pixel located at position (y=a,c). If, however, motion compensation is not accurate, a "0" is entered at that location of BDA. In such a case, the value of the missing pixel at location a is determined by spatial interpolation of neighboring values.

To provide flexibility in this case, either vertical interpolation, i.e., averaging the values of the available pixels that are above and below the missing pixel, or directional interpolation along edge directions passing through location a can be applied, depending on quality and speed constraints. In accordance with a preferred embodiment, vertical averaging is used for spatial interpolation. In FIG. 12(a), this corresponds to calculating value (a)=½[value(b)+value(s)]. In general, using an accuracy map, rather than directly applying a fixed spatial interpolation method for pixel locations where motion compensation using the global displacement vector is inaccurate, facilitates this flexibility.

In Case 2, shown in FIG. 12(b), accuracy of motion compensation for the missing pixel at location a is tested by thresholding the SAD of the two N×M blocks of pixels (e.g., N=M=3), one centered at location b within even field E1, shown as A1 in FIG. 12(b), and the other centered at location d within even field E2, shown at B1 in FIG. 12(b). Denoting the SAD as Σ|A1−B1|, then the global displacement vector (gdx,gdy) is accurate for performing motion compensated interpolation for the missing pixel at location a, if Σ|A1−B1|<T1. In this case, a "1" is denoted at the corresponding location of the "binary accuracy-detection array", BDA.

Motion-compensated interpolation is performed by copying the value of the pixel at location at c in odd field O1 to the missing pixel location a. In other words, the missing value is replaced by the pixel value at location c, i.e., value(a)=value(c). If, however, motion compensation is not accurate, a "0" is denoted at that location of BDA. In such a case, the value of the missing pixel at location a is determined by spatial interpolation of its neighboring values. Again, vertical interpolation is preferably employed. In FIG. 12(b), vertical interpolation is determined as value(a) =½[value(b)+value(s)].

In Case 3, shown in FIG. 12(c), motion-compensated interpolation is performed by copying the value of the pixel located at e in the field E2, to the missing pixel location a in the field E1, when motion compensation using the global displacement vector (gdx,gdy) is accurate for performing motion compensated interpolation for the missing pixel located at a. This operation is carried out since location e lies on the assumed motion trajectory of the missing pixel and its value is available. The accuracy is determined by first comparing the N×M blocks (e.g., N=M=3) A1 and C1, that are centered at locations a and c, respectively.

Block C1 is used since it is centered at an available pixel location c, that is closest to the estimated motion trajectory. However, there is a potential disadvantage of making the accuracy decision on the basis of A1 and C1 alone, especially in a situation such as depicted in FIG. 13, which shows the vertical displacement of an object (in black) against a background (shown in a diagonal line pattern). In this example, copying back the pixel value at e to the missing pixel location a on the basis of comparing blocks A1 and C1 results in an error, namely a "judder" in the background. In order to avoid such a situation in Case 3, the accuracy of motion is determined as follows.

Referring to FIGS. 12(c) and 13, SAD is determined for A1 and C1, i.e., Σ|A1−C1| is determined. SAD is also calculated for A1 and B1 (centered at location f), and A1 and B2 (centered at location e), i.e., Σ|A1−B1| and Σ|A1−B2|, respectively. Defining MinSum as MinSum =Minimum [Σ|A1−B1|,Σ|A1−B2|], motion compensation is determined to be accurate and motion-compensated interpolation is performed, if Σ|A1−C1|<T1 and MinSum <T2. In general T1≤T2, and a typical value for T2 is 25. In this case, a "1" is placed at the appropriate location in BA. Otherwise, a "0" is entered at that location of the BDA and spatial vertical interpolation is utilized. In FIG. 12(c), vertical is determined as value(a)=½[value(b)+value(s)].

In Case 4, shown in FIG. 12(d), accuracy of motion compensation for the missing pixel at location a is tested by thresholding the SAD of the two N×M blocks of pixels (e.g., N=M=3), one centered at location b within E1, A1 in FIG. 12(b), and the other centered at f within E2, B1 in FIG. 12(d). Denoting SAD as Σ|A1−B1|, then the global displacement vector (gdx,gdy) is accurate for performing motion compensated interpolation for the missing pixel at location a, if Σ|A1−B1|<T1. If such is the case, a "1" is entered at the corresponding location of the binary "accuracy-detection array, BDA. Motion-compensated interpolation is performed by copying the value of the pixel at location c in odd filed O1 to the missing pixel location a. In other words, the missing value is replaced by the pixel value at location c.

This is due to the fact that the pixel at location c is the closest available pixel to the assumed motion trajectory of the missing pixel. If, however, motion compensation is not accurate, a "0" is entered at that location of BDA. In such a case, the value of the missing pixel at location a is determined by spatial interpolation of its neighboring values. Again, the preferred embodiment uses vertical interpolation, determined as value(a)=½[value(b)+value(s)].

In Case 5, shown in FIG. 12(e), motion-compensated interpolation is performed by copying the value of the pixel at location e, in even field E2, to the missing pixel location a in even field E1, when motion compensation using the global displacement vector (gdx,gdy) is accurate for performing motion compensated interpolation for the missing pixel at location a. This occurs since location e is the closest available pixel location of the assumed motion trajectory for the missing pixel. The accuracy is detected by first comparing the blocks A1 and C1, which are centered at locations a and c respectively. Block C1 is used since it is centered at an available pixel that is closest to the estimated motion trajectory.

There is, however, a potential disadvantage of basing the accuracy decision on A1 and C1 alone, especially in a situation such as depicted in FIG. 13, where the vertical displacement of an object (shown in black) against a background (shown in a diagonal line pattern) is illustrated. In this example, copying back the pixel value at location e to the missing pixel location a, on the basis of comparing blocks A1 and C1, results in an error, namely the creation of a "judder" in the background.

In order to avoid these situations in Case 5 (as in Case 3), accuracy of motion is determined as follows. Referring to FIGS. 12(e) and 13, SAD is calculated for A1 and C1, i.e., Σ|A1−C1| is determined. SAD is also determined for A1 and B1 (centered at location f), as Σ|A1−B1|. Motion compensation is determined to be accurate and motion-compensated interpolation is performed if Σ|A1−C1|<T1 and Σ|A1−B1|<T2. In this case a "1" is placed at the appropriate location in BDA. Otherwise, a "0" is placed at that location of the BDA and spatial vertical interpolation is utilized. In FIG. 12(e), vertical interpolation is defined as value(a)=½ [value(b)+value(s)].

An alternate implementation for Cases 3, 4, and 5, employs bilinear spatial interpolation to determine the comparison blocks as well as the value to be placed into the missing pixel location. As shown in FIG. 14(a), for Case 3, blocks C1' and B1', centered at interpixel locations i and d, respectively, are used to detect the accuracy of motion compensation. That is, motion compensation is determined to be accurate if Σ|A1−C1'|<T1 and Σ|A1−B1'|<T2. The block sizes are N×M (e.g., N=M=3), as described above. The values within the comparison blocks C1' and B1' are determined by bilinear interpolation. As explained previously, motion-compensated interpolation is performed by setting value(a)=value(e), and spatial interpolation is performed by setting value(a)=½[value(b)+value(s)], if motion compensation is inaccurate.

FIG. 14(b) shows an alternate implementation for Case 4, where N×M block B1' centered at location d in even field E2 is compared with the N×M block A1, in order to detect the accuracy of motion compensation, and the value at location h is placed into the missing pixel location a in performing motion-compensated interpolation, i.e., value(a)=value(h). The image values at the interpixel locations d and h, and image values within the block B1' are determined via bilinear interpolation. Spatial interpolation is performed in accordance with the relationship value(a)=½[value(b)+value (s)], if motion compensation is inaccurate.

FIG. 14(c) shows an alternate implementation for Case 5, where N×M blocks C1' and B1', centered at interpixel locations i and d, respectively, are compared with the block A1, in order to detect the accuracy of motion compensation, and the value at location r in even field E2 is placed into the missing pixel location a, in the course of performing motion-compensated interpolation, i.e., value(a)=value(r). The image values at the interpixel locations d, r, and i and image values within the comparison blocks B1' and C1' are determined via bilinear interpolation. Spatial interpolation is defined by the relationship value(a)=½[value(b)+value(s)], if motion compensation is inaccurate.

The accuracy determination routine described may also be applied to the luminance channel of the video signal. This has a potential disadvantage in the case of objects with similar luminance values but different colors. In these cases, motion compensation may be incorrectly determined to be accurate. To overcome this potential disadvantage, the present invention processes all three color channels (R, G and B) and determines that motion compensation is accurate only when the comparison blocks in all three channels pass the SAD test described above. In other words, a logical AND operation is applied to the binary values from the three channels and the result is entered at the accuracy detection array BDA.

Postprocessing unit 67

The final operation in the system shown in FIG. 6 is carried out by postprocessing unit 67, which postprocesses the deinterlaced frame in order to reduce judder artifacts that are most objectionable and are due to possible misclassification of motion compensation as accurate at certain missing pixel locations.

Examples for deinterlaced image regions with and without judder are depicted in FIGS. 15(a) and 15(b), respectively, where a region contains a diagonal edge. The postprocessing operation serves to detect judder and then removing the detected judder. Detection of the judder is based on the following premise. In the absence of judder, the even lines will be well-correlated; in the presence of judder correlation of even and odd lines that are adjacent to each other will be poor. Therefore, the process first determines the correlation between the even lines (denoted as Ce) and even and odd lines that are adjacent to each other (denoted as Ceo). The ratio of the two correlations, i.e., Ceo/Ce is then thresholded. If Ceo/Ce>T, there is a judder.

More particularly, postprocessing unit 67 examines rectangular blocks of the deinterlaced frame. Each rectangular block has a width and a height, in terms of pixels. The width (NW) is the number of pixels in each row, and the height (NH) is the number of odd lines within the block. Without a loss of generality, it is assumed that odd lines are missing and thus are interpolated during deinterlacing. Two such blocks with NW=4 and NH=2 are shown in FIG. 16. In general, the entire frame is covered by the union of such blocks.

Detection of judder may be understood from FIG. 17, where a 4×2 postprocessing block is depicted. The values o1 to o6 are determined via deinterlacing. Ce is determined by the relationship:

$$Ce = 1/6(|e1 - e4| + |e2 - e5| + |e3 - e6| + |e4 - e7| + |e5 - e8| + |e6 - e9|).$$

Ceo is determined by the relationship:

$$Ceo = 1/12(|e1 - o1| + |e2 - o2| + |e3 - o3| + |o1 - e4| + |o2 - e5| + |e4 - o4||e5 - o5| + |e6 - o6| + |o4 - e7| + |o5 - e8| + |o6 - e9|.$$

The ratio of Ceo to Ce is then examined. If Ceo/Ce>T then there is judder and the pixel values over the odd lines, determined via deinterlacing, are replaced by average values of existing pixel values (over even lines) that are immediately above and below these pixels. That is, the value o1 is replaced by ½(e1+e4), o2 is replaced by ½(e2+e5), o3 is replaced by ½(e3+e6), o4 is replaced by ½(e4+e7), and so on. Otherwise, the values remain intact and the next block is considered. Finally, it should be noted that it is also possible to embed the postprocessing operation of unit 67 into the operation of adaptive deinterlacing unit 66, using appropriate delay mechanisms in a straightforward manner, even though the postprocessing operation 67 is shown as a separate block in the system diagram of FIG. 6.

As will be appreciated from the foregoing description, the deinterlacing system according to the present invention compensates for global inter-field motion, such as that resulting from the motion of a hand-held camera, and then adapts itself to the accuracy of the global motion compensation. Since the deinterlacing method according to the present invention estimates a single global motion vector, corresponding to a relative translational displacement between the camera and the scene, it produces a deinterlaced frame containing a sharp and crisp background that is devoid of aliasing artifacts. If the estimate of the global motion vector, and global motion compensation is accurate, global-motion compensated interpolation is employed. Otherwise, spatial interpolation is employed. Advantageously, the deinterlacing system according to the present invention includes postprocessing where the deinterlaced image is processed to remove judder artifacts that may be present in the image as a result of a misclassification of the global motion vector estimate as being accurate in certain image regions. Moreover the invention is non-recursive, and does not require a history of the previous deinterlacing results. As pointed out earlier, while such a requirement may be acceptable in a progressive-display TV environment, where incoming interlaced video signals are continuously deinterlaced, it may not be inappropriate in the case of a video printer, where image prints are produced by momentarily activating the printing process when a desirable scene is viewed, without necessarily having an access to a deinterlacing history.

While we have shown and described several embodiments in accordance with the present invention, it is to be understood that the same is not limited thereto but is susceptible to numerous changes and modifications as known to a person skilled in the art, and we therefore do not wish to be limited to the details shown and described herein but intend to cover all such changes and modifications as are obvious to one of ordinary skill in the art.

PARTS LIST 61, 62, 63—Image Field Stores
64—Global Motion Vector Estimation (GMV) Unit
65—Unit for Pixelwise Detection of Accuracy of Global Motion Compensation Using GMV Estimator
66—Motion Compensation Accuracy Adaptive Deinterlacing Unit
67—Postprocessing Unit

What is claimed:

1. A method of generating a digital output image from a plurality of sequential interlaced image fields comprising the steps of:

(a) processing selected ones of said plurality of sequential interlaced image fields to produce a global motion vector estimate of global translational motion between said selected ones of said plurality of sequential interlaced image fields;

(b) generating an accuracy map representative of accuracy of motion compensation from said global motion vector estimate produced in step (a);

(c) selectively deinterlacing one of said plurality of sequential interlaced image fields in accordance with said accuracy map generated in step (b) and;

(d) postprocessing the selectively deinterlaced image field resulting from step (c) so as to remove artifacts remaining from both inaccurate motion estimation and the misclassification of the accuracy of the global motion vector estimate in one of more regions of said deinterlaced image field.

2. A method according to claim 1, further comprising the step (d) of postprocessing the selectively deinterlaced image field resulting from step (c) so as to remove judder artifacts that may be present in said deinterlaced image field as a result of a misclassification of the global motion vector estimate as being accurate in one or more image regions of said deinterlaced image field.

3. A method according to claim 2, wherein said step (d) of postprocessing the selectively deinterlaced image field resulting from step (c) to remove judder artifacts comprises determining respective first and second correlations between even lines, and even and odd lines that are adjacent to each other, comparing the ratio of the two correlations to a prescribed threshold, and selectively replacing pixel values by interpolated neighboring pixel values in dependence upon the result of said comparing step.

4. A method according to claim 3, wherein said selective replacing step comprises replacing pixel values by average values of existing pixel values that are immediately above and below the replaced pixels.

5. A method according to claim 1, wherein step (c) comprises adaptively deinterlacing one of said plurality of sequential interlaced image fields by adaptively switching between motion compensated interpolation and spatial interpolation in dependence upon said accuracy map generated in step (b).

6. A method according to claim 1, wherein step (b) comprises generating an accuracy bit map representative of accuracy of motion compensation on a pixel-by-pixel basis in accordance with said global motion vector estimate produced in step (a).

7. A method according to claim 1, wherein step (a) comprises processing immediately successive image fields of the same image field polarity to produce said global motion vector estimate of global translational motion.

8. A method according to claim 1, wherein step (a) comprises performing phase correlation between said selected ones of said plurality of sequential interlaced image fields to produce said global motion vector estimate of global translational motion.

9. A method according to claim 1, wherein step (a) comprises generating a plurality of motion vectors respectively associated with a plurality of subregions of one of said plurality of interlaced image fields, and selecting, as representative of global displacement of the entirety of said one image field, that one of said plurality of motion vectors whose sum of absolute pixel-by-pixel difference for pixels of its associated subregion and those of a corresponding subregion of another of said plurality of sequential interlaced image fields is smallest.

10. A method according to claim 9, wherein said one and said another of said plurality of sequential interlaced image fields have the same image field polarity.

11. A method according to claim 10, wherein step (a) comprises performing phase correlation between said selected ones of said plurality of sequential interlaced image fields to produce said global motion vector estimate of global translational motion.

12. A method according to claim 11, wherein said step of performing phase correlation comprises performing phase correlation for each of said plurality of subregions so as to produce a respective phase correlation surface for each subregion, phase correlation being performed between the co-located subregion blocks of said one and said another of said plurality of sequential interlaced image fields having the same image field polarity, and subjecting each phase correlation surface to a thresholding operation, thereby producing, for each subregion, a respective vector set containing a predetermined number of candidate motion vectors.

13. A method according to claim 12, wherein step (a) comprises selecting, as a potential global displacement vector candidate, that vector of each vector set that best describes motion of its associated subregion.

14. A method according to claim 13, wherein said step of selecting a potential global displacement vector candidate comprises selecting, as said potential global displacement vector candidate, that vector of each vector set whose sum of absolute pixel-by-pixel difference for pixels of its associated subregion and those of a corresponding subregion of said another of said plurality of sequential interlaced image fields is smallest.

15. A method according to claim 9, wherein said sum of absolute pixel-by-pixel difference is computed on the basis of those pixels that are contained in a largest common area of pixels of said one and said another of said plurality of sequential interlaced image fields.

16. A method according to claim 9, wherein components of said global motion vector are integer-valued.

17. A method according to claim 9, wherein step (a) further comprises refining said potential global displacement vector to a prescribed subpixel accuracy.

18. A method according to claim 17, wherein said step of refining said potential global displacement vector to a prescribed subpixel accuracy comprises shifting said another image field, so that prescribed spatial coordinates thereof coincide with grid points associated with pixel and subpixel locations distributed around a point on said global displacement vector, thereby forming a search grid for refining said global displacement vector to said prescribed subpixel accuracy.

19. A method according to claim 18, wherein said refining step further comprises computing a corresponding sum of absolute pixel-by-pixel difference for grid point locations around said point, and performing an iterative refinement of said potential global displacement vector in accordance with absolute pixel-by-pixel differences for grid points associated with increasingly finer spatial resolution.

20. A method according to claim 19, wherein said refining step includes interpolation of subpixel values within said another image field.

21. A method according to claim 20, wherein said interpolation comprises bilinear interpolation.

22. A method according to claim 1, wherein step (b) comprises measuring the accuracy of said global motion compensation vector for every missing pixel in said one of said plurality of sequential interlaced image fields, so as to determine whether or not said global motion vector estimate is sufficiently accurate to describe motion of said every missing pixel.

23. A method according to claim 22, wherein step (a) comprises generating a plurality of motion vectors respectively associated with a plurality of subregions of one of said plurality of interlaced image fields, and selecting, as representative of global displacement of the entirety of said one image field, that one of said plurality of motion vectors whose sum of absolute pixel-by-pixel difference for pixels of its associated subregion and those of a corresponding subregion of another of said plurality of sequential interlaced image fields is smallest.

24. A method according to claim 23, wherein step (c) comprises testing the accuracy of motion compensation for a missing pixel by thresholding the sum of absolute pixel-by-pixel differences of respective blocks of pixels in said one and said another image field, and by thresholding the sum of absolute pixel-by-pixel differences of respective blocks of pixels in said one image field and another image field intermediate said one image field, and declaring said global displacement vector as accurate for performing motion compensated interpolation for a missing pixel in said one image field in accordance with a prescribed relationship between the resulting thresholded sums and respective reference values.

25. A method according to claim 24, wherein step (b) comprises, in response to declaring said global displacement vector as accurate for performing motion compensated interpolation for a missing pixel in said one image field, storing a first prescribed binary value at a location in said accuracy map.

26. A method according to claim 25, wherein step (b) comprises, in response to declaring said global displacement vector as inaccurate for performing motion compensated interpolation for a missing pixel in said one image field, storing a second prescribed binary value at a location in said accuracy map.

27. A method according to claim 26, wherein step (c) comprises performing spatial interpolation of said missing pixel on the basis of neighboring pixels.

28. A method according to claim 27, wherein said step of performing spatial interpolation of said missing pixel comprises either vertical interpolation of pixels above and below said missing pixel, or directional interpolation along edge directions passing through said missing pixel.

29. A method according to claim 25, wherein step (c) comprises copying the value of a pixel located in a field intermediate said one and another image fields to the location of the missing pixel in said one image field.

30. A method according to claim 23, wherein step (c) comprises testing the accuracy of motion compensation for a missing pixel by thresholding the sum of absolute pixel-by-pixel differences of respective blocks of pixels in said one and said another image field, and declaring said global displacement vector as accurate for performing motion compensated interpolation for a missing pixel in said one image field in accordance with a prescribed relationship between the thresholded sum and a reference value.

31. A method according to claim 30, wherein step (b) comprises, in response to declaring said global displacement vector as accurate for performing motion compensated interpolation for a missing pixel in said one image field, storing a first prescribed binary value at a location in said accuracy map.

32. A method according to claim 31, wherein step (b) comprises, in response to declaring said global displacement vector as inaccurate for performing motion compensated interpolation for a missing pixel in said one image field, storing a second prescribed binary value at a location in said accuracy map.

33. A method according to claim 32, wherein step (c) comprises performing spatial interpolation of said missing pixel on the basis of neighboring pixels.

34. A method according to claim 33, wherein said step of performing spatial interpolation of said missing pixel comprises either vertical interpolation of pixels above and below said missing pixel, or directional interpolation along edge directions passing through said missing pixel.

35. A method according to claim 31, wherein step (c) comprises copying the value of a pixel located in a field intermediate said one and another image fields to the location of the missing pixel in said one image field.

36. A method according to claim 1, wherein said plurality of sequential interlaced image fields are color image fields, and wherein steps (a)–(c) are carried out for multiple color channels.

37. An apparatus for generating a digital output image from a plurality of sequential interlaced image fields comprising:

an image field supply path which supplies pixel value signals representative of pixels of first, second and third image fields of said plurality of sequential interlaced image fields;

a global motion vector estimation unit which is coupled to said image field supply path and is operative to process selected ones of said first, second and third image fields to produce a global motion vector estimate of global translational motion between said selected image fields;

an accuracy map generation unit which is coupled to said image field supply path and to said global motion vector estimation unit and is operative to generate an accuracy map representative of accuracy of motion compensation in accordance with said global motion vector estimate produced by said global motion vector estimation unit; and a deinterlacer, which is coupled to said accuracy map generation unit and to said image field supply path and is operative to controllably deinterlace one of said first, second and third image fields in accordance with said accuracy map.

a postprocessing unit which is coupled to said deinterlacer and is operative to selectively remove artifacts remaining from both inaccurate motion estimation and the misclassification of the accuracy of the global motion vector estimate in one of more regions of said deinterlaced image field.

38. An apparatus according to claim 37, further comprising a postprocessing unit which is coupled to said deinterlacer and is operative to selectively remove judder artifacts that may be present in the deinterlaced image field output by said deinterlace, as a result of a misclassification of the global motion vector estimate as being accurate in one or more image regions of said deinterlaced image field.

39. An apparatus according to claim 38, wherein said postprocessing unit is operative to remove judder artifacts by determining respective first and second correlations between even lines, and even and odd lines that are adjacent to each other, comparing the ratio of the two correlations to a prescribed threshold, and selectively replacing pixel values by interpolated neighboring pixel values in dependence upon the result of said comparing step.

40. An apparatus according to claim 39, wherein said postprocessing unit is operative to replace pixel values by average values of existing pixel values that are immediately above and below the replaced pixels.

41. An apparatus according to claim 37, wherein said deinterlacer comprises an adaptive deinterlacer which is operative to adaptively deinterlace said one of said first, second and third image fields by adaptively switching between motion compensated interpolation and spatial interpolation in dependence upon said accuracy map.

42. An apparatus according to claim 37, wherein said accuracy map generation unit is operative to generate an accuracy bit map representative of accuracy of motion compensation on a pixel-by-pixel basis in accordance with said global motion vector estimate supplied thereto by said global motion vector estimation unit.

43. An apparatus according to claim 42, wherein said global motion vector estimation unit is operative to process immediately successive image fields of the same image field polarity to produce said global motion vector estimate of global translational motion.

44. An apparatus according to claim 37, wherein said global motion vector estimation unit is operative to perform phase correlation between said selected ones of said plurality of sequential interlaced image fields to produce said global motion vector estimate of global translational motion.

45. An apparatus according to claim 37, wherein said global motion vector estimation unit is operative to generate a plurality of motion vectors respectively associated with a plurality of subregions of one of said selected ones of said plurality of interlaced image fields, and to select, as representative of global displacement of the entirety of said one image field, that one of said plurality of motion vectors whose sum of absolute pixel-by-pixel difference for pixels of its associated subregion and those of a corresponding subregion of another of said selected ones of said plurality of sequential interlaced image fields is smallest.

46. An apparatus according to claim 45, wherein said one and said another of said selected ones of said plurality of sequential interlaced image fields have the same image field polarity.

47. An apparatus according to claim 46, wherein said global motion vector estimation unit produces said global motion vector estimate of global translational motion in accordance with phase correlation between said selected ones of said plurality of sequential interlaced image fields.

48. An apparatus according to claim 47, wherein said global motion vector estimation unit performs phase correlation between co-located subregion blocks of said one and said another of said selected ones of said plurality of sequential interlaced image fields having the same image field polarity, so as to produce a respective phase correlation surface for each subregion, and subjects each phase correlation surface to a thresholding operation, thereby producing, for each subregion, a respective vector set containing a predetermined number of candidate motion vectors.

49. An apparatus according to claim 48, wherein global motion vector estimation unit is operative to select, as a potential global displacement vector candidate, that vector of each vector set that best describes motion of its associated subregion.

50. An apparatus according to claim 49, wherein said global motion vector estimation unit is operative to select, as said potential global displacement vector candidate, that vector of each vector set whose sum of absolute pixel-by-pixel difference for pixels of its associated subregion and those of a corresponding subregion of said another of said plurality of sequential interlaced image fields is smallest.

51. An apparatus according to claim 45, wherein said global motion vector estimation unit is operative to compute said sum of absolute pixel-by-pixel difference on the basis of those pixels that are contained in a largest common area of pixels of said one and said another of said selected ones of said plurality of sequential interlaced image fields.

52. An apparatus according to claim 45, wherein said global motion vector estimation unit outputs integer-valued components of said global motion vector.

53. An apparatus according to claim 45, wherein said global motion vector estimation unit produces said potential global displacement vector with a prescribed subpixel accuracy.

54. A method according to claim 53, wherein said global motion vector estimation unit is operative to shift said another image field, so that prescribed spatial coordinates thereof coincide with grid points associated with pixel and subpixel locations distributed around a point on said global displacement vector, thereby forming a search grid for producing said global displacement vector with said prescribed subpixel accuracy.

55. An apparatus according to claim 54, wherein said global motion vector estimation unit is operative to compute a corresponding sum of absolute pixel-by-pixel difference for grid point locations around said point, and execute an iterative refinement of said potential global displacement vector in accordance with absolute pixel-by-pixel differences for grid points associated with increasingly finer spatial resolution.

56. An apparatus according to claim 55, wherein said global motion vector estimation unit is operative to interpolate subpixel values within said another image field, using bilinear interpolation.

57. An apparatus according to claim 37, wherein said accuracy map generation unit is operative to measure the accuracy of said global motion compensation vector for every missing pixel in said one of said plurality of sequential interlaced image fields, and thereby determine whether or not said global motion vector estimate is sufficiently accurate to describe motion of said every missing pixel.

58. An apparatus according to claim 57, wherein said global motion vector estimation unit is operative to generate a plurality of motion vectors respectively associated with a plurality of subregions of one of said selected ones of said plurality of interlaced image fields, and to select, as representative of global displacement of the entirety of said one image field, that one of said plurality of motion vectors whose sum of absolute pixel-by-pixel difference for pixels of its associated subregion and those of a corresponding subregion of another of said selected ones of said plurality of sequential interlaced image fields is smallest.

59. An apparatus according to claim 58, wherein said deinterlacer is operative to test the accuracy of motion compensation for a missing pixel by thresholding the sum of absolute pixel-by-pixel differences of respective blocks of pixels in said one and said another image field, and declaring said global displacement vector as accurate for performing motion compensated interpolation for a missing pixel in said one image field in accordance with a prescribed relationship between the thresholded sum and a reference value.

60. An apparatus according to claim 59, wherein said accuracy map generation unit places a first prescribed binary value at a location in said accuracy map, in response to declaring said global displacement vector as accurate for performing motion compensated interpolation for a missing pixel in said one image field.

61. An apparatus according to claim 60, wherein said accuracy map generation unit places a second prescribed binary value at a location in said accuracy map, in response to declaring said global displacement vector as inaccurate for performing motion compensated interpolation for a missing pixel in said one image field.

62. An apparatus according to claim 61, wherein said deinterlacer is operative to perform spatial interpolation of said missing pixel on the basis of neighboring pixels.

63. An apparatus according to claim 62, wherein said deinterlacer performs spatial interpolation of said missing pixel by either vertical interpolation of pixels above and below said missing pixel, or directional interpolation along edge directions passing through said missing pixel.

64. An apparatus according to claim 60, wherein said deinterlacer is operative to copy the value of a pixel located in a field intermediate said one and another image fields to the location of the missing pixel in said one image field.

65. An apparatus according to claim 58, wherein said deinterlacer is operative to test the accuracy of motion compensation for a missing pixel by thresholding the sum of absolute pixel-by-pixel differences of respective blocks of pixels in said one and said another image field, and by thresholding the sum of absolute pixel-by-pixel differences of respective blocks of pixels in said one image field and another image field intermediate said one image field, and declaring said global displacement vector as accurate for performing motion compensated interpolation for a missing pixel in said one image field in accordance with a prescribed relationship between the resulting thresholded sums and respective reference values.

66. An apparatus according to claim 65, wherein said accuracy map generation unit places a first prescribed binary value at a location in said accuracy map, in response to declaring said global displacement vector as accurate for performing motion compensated interpolation for a missing pixel in said one image field.

67. An apparatus according to claim 66, wherein said accuracy map generation unit places a second prescribed binary value at a location in said accuracy map, in response to declaring said global displacement vector as inaccurate for performing motion compensated interpolation for a missing pixel in said one image field.

68. An apparatus according to claim 67, wherein said deinterlacer is operative to spatially interpolate said missing pixel on the basis of neighboring pixels.

69. An apparatus according to claim 68, wherein said deinterlacer is operative to spatially interpolate said missing pixel either by vertical interpolation of pixels above and below said missing pixel, or by directional interpolation along edge directions passing through said missing pixel.

70. An apparatus according to claim 66, wherein said deinterlacer copies the value of a pixel located in a field intermediate said one and another image fields to the location of the missing pixel in said one image field.

71. An apparatus according to claim 37, wherein said plurality of sequential interlaced image fields are color image fields, and wherein said apparatus generates said digital output image on the basis of multiple color channels.

* * * * *